(12) United States Patent
Hsueh et al.

(10) Patent No.: US 10,156,702 B2
(45) Date of Patent: Dec. 18, 2018

(54) IMAGE LENS ASSEMBLY, IMAGING APPARATUS AND ELECTRONIC DEVICE

(71) Applicant: LARGAN PRECISION CO., LTD., Taichung (TW)

(72) Inventors: Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 18 days.

(21) Appl. No.: 15/366,124

(22) Filed: Dec. 1, 2016

(65) Prior Publication Data
US 2018/0045913 A1    Feb. 15, 2018

(30) Foreign Application Priority Data
Aug. 9, 2016  (TW) .............................. 105125270 A

(51) Int. Cl.
| | | |
|---|---|---|
| G02B 13/00 | (2006.01) | |
| G02B 5/00 | (2006.01) | |
| G02B 5/20 | (2006.01) | |
| G02B 9/62 | (2006.01) | |
| G02B 27/00 | (2006.01) | |
| G02B 27/01 | (2006.01) | |

(52) U.S. Cl.
CPC ......... *G02B 13/0045* (2013.01); *G02B 5/005* (2013.01); *G02B 5/208* (2013.01); *G02B 9/62* (2013.01); *G02B 27/0025* (2013.01); *G02B 2027/0138* (2013.01)

(58) Field of Classification Search
CPC ...... G02B 13/0045; G02B 13/18; G02B 3/04; G02B 9/62

USPC ......................................................... 359/713
See application file for complete search history.

(56) References Cited

U.S. PATENT DOCUMENTS

| | | | |
|---|---|---|---|
| 8,432,619 B2 | 4/2013 | Huang | |
| 2012/0229917 A1* | 9/2012 | Huang | G02B 13/0045 359/713 |
| 2015/0370042 A1* | 12/2015 | Chen | G02B 13/0045 359/713 |

(Continued)

FOREIGN PATENT DOCUMENTS

| | | |
|---|---|---|
| CN | 105467562 A | 4/2016 |
| CN | 106154495 A | 11/2016 |

(Continued)

*Primary Examiner* — Darryl J Collins
*Assistant Examiner* — Kristina Deherrera
(74) *Attorney, Agent, or Firm* — Locke Lord LLP; Tim Tingkang Xia, Esq.

(57) ABSTRACT

The present disclosure provides an image lens assembly comprising, in order from an object side to an image side: a first lens element with positive refractive power having an object-side surface being convex in a paraxial region thereof; a second lens element; a third lens element having an object-side surface being convex in a paraxial region thereof; a fourth lens element; a fifth lens element with an image-side surface having at least one convex critical point in an off-axial region thereof, both of an object-side surface and the image-side surface thereof being aspheric; and a sixth lens element having an image-side surface being concave in a paraxial region thereof and at least one convex critical point in an off-axial region thereof, both of an object-side surface and the image-side surface thereof being aspheric.

24 Claims, 20 Drawing Sheets

(56) References Cited

U.S. PATENT DOCUMENTS

2017/0146776 A1   5/2017  Kang et al.
2017/0299845 A1  10/2017  Yao et al.
2017/0307849 A1  10/2017  Jhang et al.
2017/0307850 A1  10/2017  Jhang et al.
2017/0351064 A1  12/2017  Chang et al.

FOREIGN PATENT DOCUMENTS

EP         2871509 A2    5/2015
TW         201237454 A   9/2012
WO       2013046567 A1   4/2013

* cited by examiner

IMAGE LENS ASSEMBLY, IMAGING APPARATUS AND ELECTRONIC DEVICE

RELATED APPLICATIONS

This application claims priority to Taiwan Application Serial Number 105125270, filed on Aug. 9, 2016, which is incorporated by reference herein in its entirety.

BACKGROUND

Technical Field

The present disclosure relates to an image lens assembly and an imaging apparatus, and more particularly, to an image lens assembly and an imaging apparatus applicable to electronic devices.

Description of Related Art

As electronic products are becoming even smaller, thinner and lighter these years, imaging apparatuses installed in these electronic products need to become more and more compact accordingly. However, most high-quality compact imaging systems are available on the market with very limited angle of views and aperture sizes. As a result, it is hard to photograph a large area or achieve a sufficient depth of field in an image with such a compact imaging system. On the other hand, as for conventional imaging lens assemblies with relatively large field of views and large apertures, most of them tend to have longer back focal lengths, larger sizes or unsatisfactory image quality, and are therefore difficult for use in portable electronic devices. In view of the above, there exists a need for an optical imaging lens that features a wide field of view and a compact size while achieving high image quality at the same time.

SUMMARY

According to one aspect of the present disclosure, an image lens assembly comprises, in order from an object side to an image side: a first lens element with positive refractive power having an object-side surface being convex in a paraxial region thereof; a second lens element; a third lens element having an object-side surface being convex in a paraxial region thereof; a fourth lens element; a fifth lens element with an image-side surface having at least one convex critical point in an off-axial region thereof, both of an object-side surface and the image-side surface thereof being aspheric; and a sixth lens element with an image-side surface being concave in a paraxial region thereof and having at least one convex critical point in an off-axial region thereof, both of an object-side surface and the image-side surface thereof being aspheric. The image lens assembly has a total of six lens elements, wherein each of the first through sixth lens elements is a single and non-cemented lens element; a focal length of the image lens assembly is f, a focal length of the first lens element is f1, a focal length of the fourth lens element is f4, a curvature radius of the object-side surface of the third lens element is R5, a curvature radius of an image-side surface of the fourth lens element is R8, a curvature radius of the image-side surface of the fifth lens element is R10, and the following conditions are satisfied:

$0 \leq f/R8 < 10;$ $0 \leq f/R10 < 10;$ $0.80 < f/R5 < 10;$ and $|f1/|f4|| < 1.0.$ According to another aspect of the present disclosure, an image lens assembly comprises, in order from an object side to an image side: a first lens element with positive refractive power having an object-side surface being convex in a paraxial region thereof and an image-side surface being concave in a paraxial region thereof; a second lens element; a third lens element having an object-side surface being convex in a paraxial region thereof; a fourth lens element; a fifth lens element with an image-side surface having at least one convex critical point in an off-axial region thereof, both of an object-side surface and the image-side surface thereof being aspheric; and a sixth lens element with an object-side surface being convex in a paraxial region thereof, an image-side surface being concave in a paraxial region thereof and having at least one convex critical point in an off-axial region thereof, and both of the object-side surface and the image-side surface thereof being aspheric. The image lens assembly has a total of six lens elements, wherein each of the first through sixth lens elements is a single and non-cemented lens element; a focal length of the image lens assembly is f, a curvature radius of the object-side surface of the third lens element is R5, a curvature radius of an image-side surface of the fourth lens element is R8, a curvature radius of the image-side surface of the fifth lens element is R10, and the following conditions are satisfied:

$0 \leq f/R8 < 10;$ $0 \leq f/R10 < 10;$ and $0.80 < f/R5 < 10.$

According to yet another aspect of the present disclosure, an imaging apparatus comprises the aforementioned image lens assembly and an image sensor.

According to still another aspect of the present disclosure, an electronic device comprises the aforementioned imaging apparatus.

DETAILED DESCRIPTION

Figure 1A:
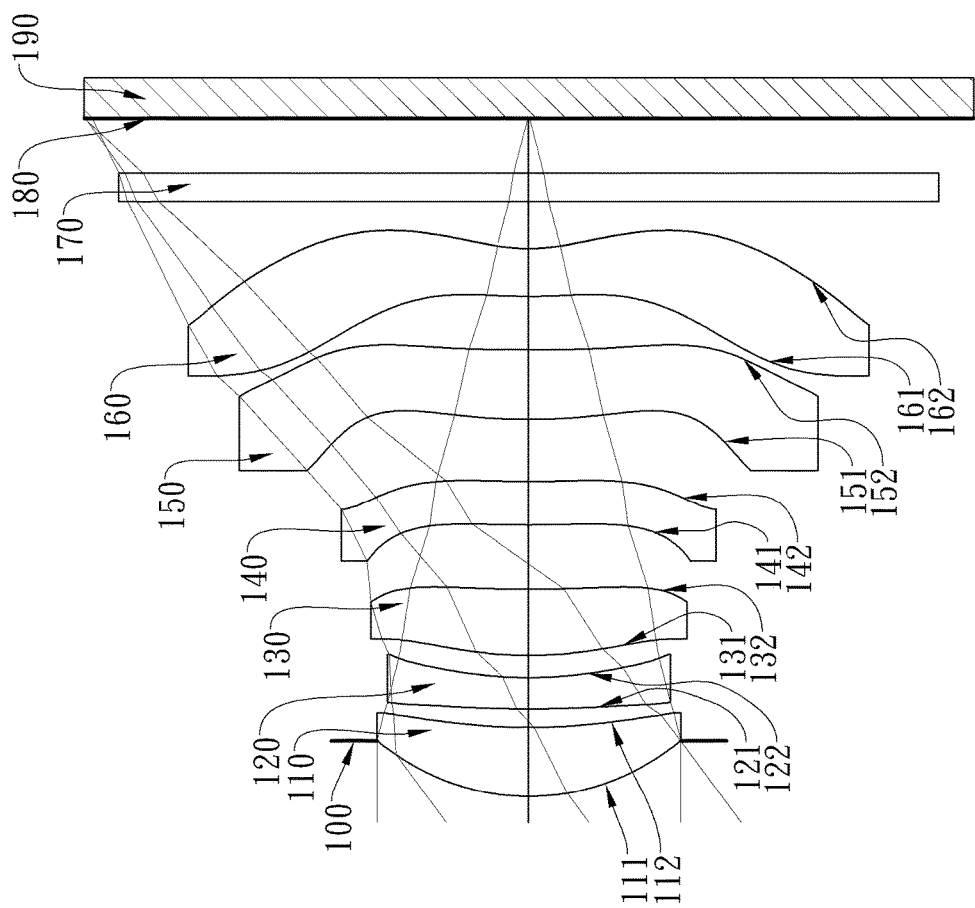
FIG. 1A is a schematic view of an imaging apparatus according to the 1st embodiment of the present disclosure.

The present disclosure provides an image lens assembly comprising, from an object side to an image side, a first lens element, a second lens element, a third lens element, a fourth lens element, a fifth lens element and a sixth lens element, wherein the image lens assembly has a total of six lens elements.

The first lens element with positive refractive power has an object-side surface being convex in a paraxial region thereof and may have an image-side surface being concave in a paraxial region thereof. When the first lens element has the image-side surface being concave in a paraxial region thereof, the first lens element can utilize the aberration correction characteristic of a meniscus lens element, and therefore allows the image lens assembly to achieve high image quality.

The second lens element may have negative refractive power, which can help correct aberrations generated by the first lens element.

The third lens element may have positive refractive power. The third lens element further has an object-side surface being convex in a paraxial region thereof, may have an image-side surface being concave in a paraxial region thereof with at least one convex critical point in an off-axial region thereof. With this configuration, it is favorable for correcting distortion at the peripheral image field, thereby avoiding defocused images due to excessive distortion.

The fifth lens element has an image-side surface with at least one convex critical point in an off-axial region thereof, which can correct aberrations at the peripheral image field.

The sixth lens element may have an object-side surface being convex in a paraxial region thereof. The sixth lens element further has an image-side surface being concave in a paraxial region thereof and at least one convex critical point in an off-axial region thereof, which can correct system aberrations. The sixth lens element may have the largest central thickness among the six lens elements of the image lens assembly in order to ensure the larger sixth lens element has sufficient structural strength favorable for the formation of a lens element and a higher stress threshold during the assembling process.

Each of the first through sixth lens elements may have an object-side surface being convex in a paraxial region thereof and an image-side surface being concave in a paraxial region thereof. Accordingly, the aberration correction capability of each lens element can be properly adjusted.

When the following conditions are satisfied: $0 \leq f/R8<10$ and $0 \leq f/R10<10$, the shape variation of the fourth and fifth lens elements can be reduced, which can help avoid manufacturing problems from an excessively curved lens element or an excessively large thickness difference between the central region and the peripheral region of a lens element. When the above conditions are satisfied, it can prevent the excessively large difference in refractive power between the central region and the peripheral region of a lens element, thereby reducing the sensitivity in the manufacturing tolerance.

When the following condition is satisfied: $0.80<f/R5<10$, aberrations can be favorably corrected and image quality can be improved.

When the following condition is satisfied: $f1/|f4|<1.0$, it can help prevent overcorrecting aberrations due to excessively high refractive power of the fourth lens element and further improve image quality. Preferably, the following condition is satisfied: $f1/|f4|<0.50$. When a sum of axial distances between every two adjacent lens elements of the image lens assembly is $\Sigma AT$, an axial distance between the fourth lens element and the fifth lens element is T45, and the following condition is satisfied: $\Sigma AT/T45<7.0$, it can prevent the fourth lens element and the fifth lens element from being too close, and the interference within the effective diameter during the lens assembling process.

When an axial distance between the object-side surface of the first lens element and the image-side surface of the sixth lens element is Td, an entrance pupil diameter of the image lens assembly is EPD, and the following condition is satisfied: $1.0<Td/EPD<2.0$, it can ensure a large entrance pupil with increased light entering the assembly. It is also favorable for minimizing the image lens assembly with high image sharpness and clarity.

When the focal length of the image lens assembly is f, the focal length of the fourth lens element is f4, a focal length of the fifth lens element is f5, a focal length of the sixth lens element is f6, and the following condition is satisfied: $|f/f4|+|f/f5|+|f/f6|<2.0$, it can further prevent the excessive refractive power from the lens elements closer to the image surface, which may lead to extreme variations in lens shapes and high sensitivity of the lens elements, or other lens forming problems.

When a maximum of axial distances between every two adjacent lens elements of the image lens assembly is ATmax, a minimum of axial distances between every two adjacent lens elements of the image lens assembly is ATmin, and the following condition is satisfied: $ATmax/ATmin<7.50$, the spacing between every two adjacent lens elements can be properly distributed, thereby preventing assembling problems due to excessively small spacing or avoiding difficulties in controlling manufacturing tolerances due to excessively large spacing.

When the axial distance between the object-side surface of the first lens element and the image-side surface of the sixth lens element is Td, the sum of axial distances between every two adjacent lens elements of the image lens assembly is $\Sigma AT$, and the following condition is satisfied: $2.0<Td/\Sigma AT<20$, the limited space within the image lens assembly can be better utilized, thereby avoiding a waste of space due to excessively large gaps between lens elements.

When the focal length of the first lens element is f1, a focal length of the third lens element is f3, and the following condition is satisfied: $f1/|f3|<1.0$, it can further ensure that the image lens assembly has appropriate refractive power in each lens element, thereby preventing excessive or insufficient aberration corrections of the image due to excessively high or low refractive power.

When an axial distance between the third lens element and the fourth lens element is T34, and T34 is the maximum axial distance among the axial distances between every two adjacent lens elements, it can further ensure sufficient spacing between the third lens element and the fourth lens element, and the relatively thinner fourth lens element having sufficient space not to interfere with the third lens element.

When a central thickness of the fourth lens element is CT4, a distance in parallel with an optical axis from an axial vertex on the image-side surface of the fourth lens element to a maximum effective diameter position on the image-side surface of the fourth lens element is Sag42, and the following condition is satisfied: $1.75<CT4/|Sag42|$, it can reduce the overall shape variation of the fourth lens element, thereby preventing the excessively large angles on the surfaces of the fourth lens element, which may lead to ghost images due to strong surface reflections; also, it can prevent the overall shape of the fourth lens element from being excessively curved to avoid manufacturing problems.

When a central thickness of the second lens element is CT2, a central thickness of the third lens element is CT3, and the following condition is satisfied: $2.0<CT3/CT2<3.5$, it can ensure that the configuration of the third lens element is more favorable for manufacturing and avoid manufacturing problems like structural strength issues due to the improper thickness of the third lens element.

According to the image lens assembly of the present disclosure, the lens elements thereof can be made of glass or plastic. When the lens elements are made of glass, the distribution of the refractive power of the image lens assembly is more flexible to design. When the lens elements are made of plastic, the manufacturing cost can be effectively reduced. Furthermore, surfaces of each lens element can be arranged to be aspheric (ASP). As aspheric surfaces can be easily formed into shapes other than spherical shapes, more controllable variables can be obtained to eliminate aberrations and to further decrease the required number of lens elements. Thus, the total track length of the image lens assembly can be effectively reduced.

According to the image lens assembly of the present disclosure, the image lens assembly can include at least one stop, such as an aperture stop, a glare stop or a field stop, so as to favorably reduce the stray light to improve the image quality.

According to the image lens assembly of the present disclosure, a stop can be configured as a front stop or a middle stop. A front stop disposed between an imaged object and the first lens element can provide a longer distance between an exit pupil and the image surface, so that the generated telecentric effect can improve the image-sensing efficiency of an image sensor, such as a CCD or CMOS sensor. A middle stop disposed between the first lens element and the image surface is favorable for enlarging the field of view, thereby providing the image lens assembly with the advantages of a wide-angle lens.

According to the image lens assembly of the present disclosure, when a lens element has a convex surface and the region of convex shape is not specified, it indicates that the surface can be convex in the paraxial region thereof; when the lens element has a concave surface and the region of concave shape is not specified, it indicates that the surface can be concave in the paraxial region thereof. Likewise, when the region of refractive power or focal length of a lens element is not specified, it indicates that the region of refractive power or focal length of the lens element can be in the paraxial region thereof.

According to the image lens assembly of the present disclosure, the image surface of the image lens assembly, based on the corresponding image sensor, can be a planar or curved surface with any curvature, especially a curved surface being concave facing towards the object side.

The image lens assembly of the present disclosure can be optionally applied to moving-focus optical systems. The image lens assembly of the present disclosure features good correction capability and high image quality, and can be applied to 3D (three-dimensional) image capturing applications and electronic devices, such as digital cameras, mobile devices, smartphones, digital tablets, smart TVs, network surveillance devices, motion sensing input devices, driving recording systems, rear view camera systems, drone cameras and wearable devices.

The present disclosure further provides an imaging apparatus comprising the aforementioned image lens assembly and an image sensor, wherein the image sensor is disposed on or near an image surface of the image lens assembly. Therefore, the design of the image lens assembly enables the imaging apparatus to achieve high image quality. Preferably, the image lens assembly can further comprise a barrel member, a holding member or a combination thereof.

Figure 8A:
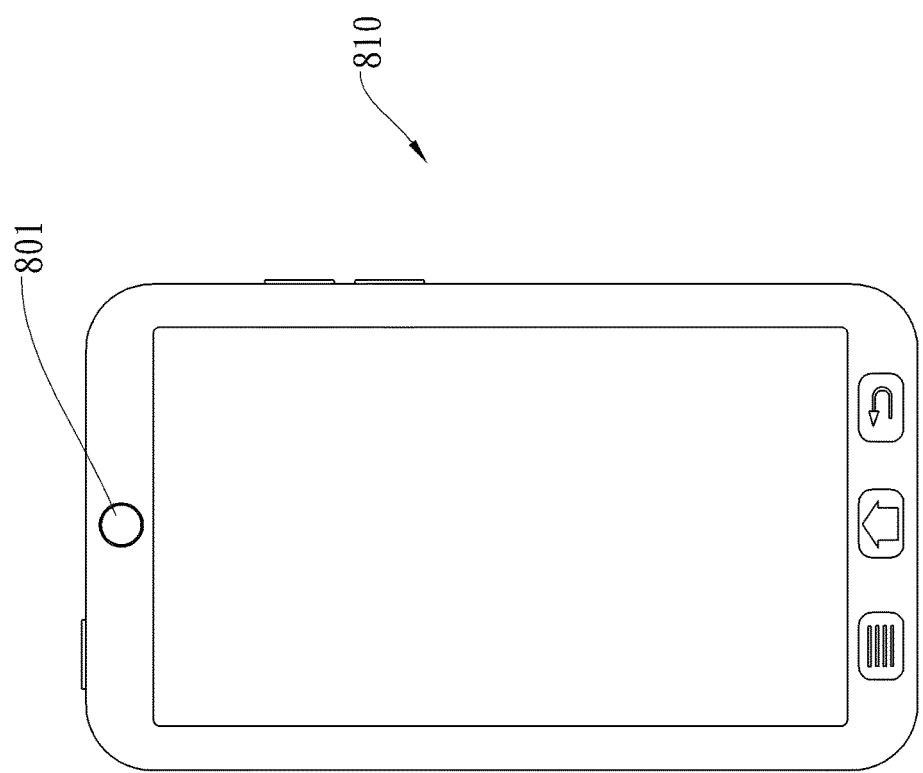
FIG. 8A shows a smartphone with an imaging apparatus of the present disclosure installed therein.
Figure 8B:
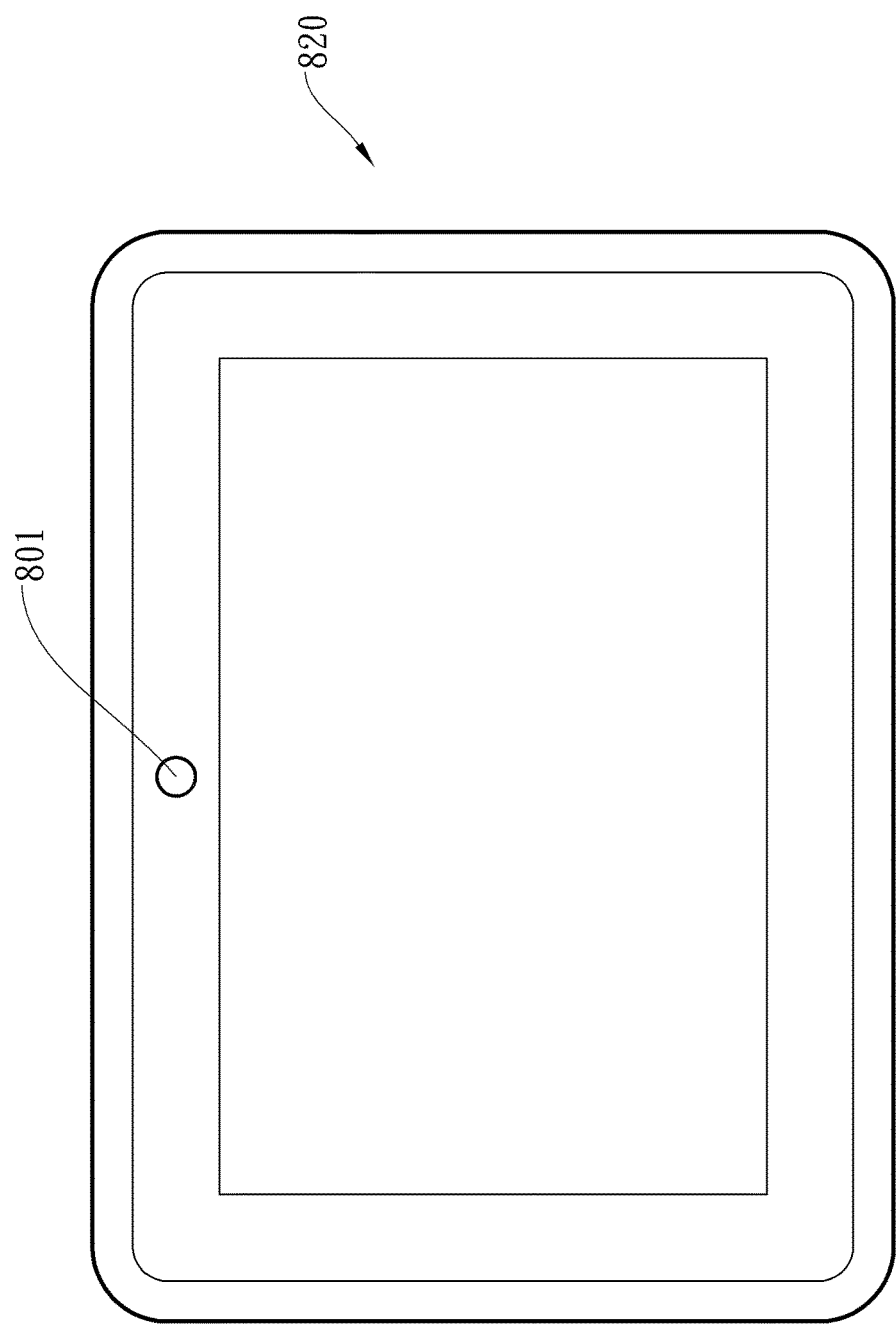
FIG. 8B shows a tablet personal computer with an imaging apparatus of the present disclosure installed therein.
Figure 8C:
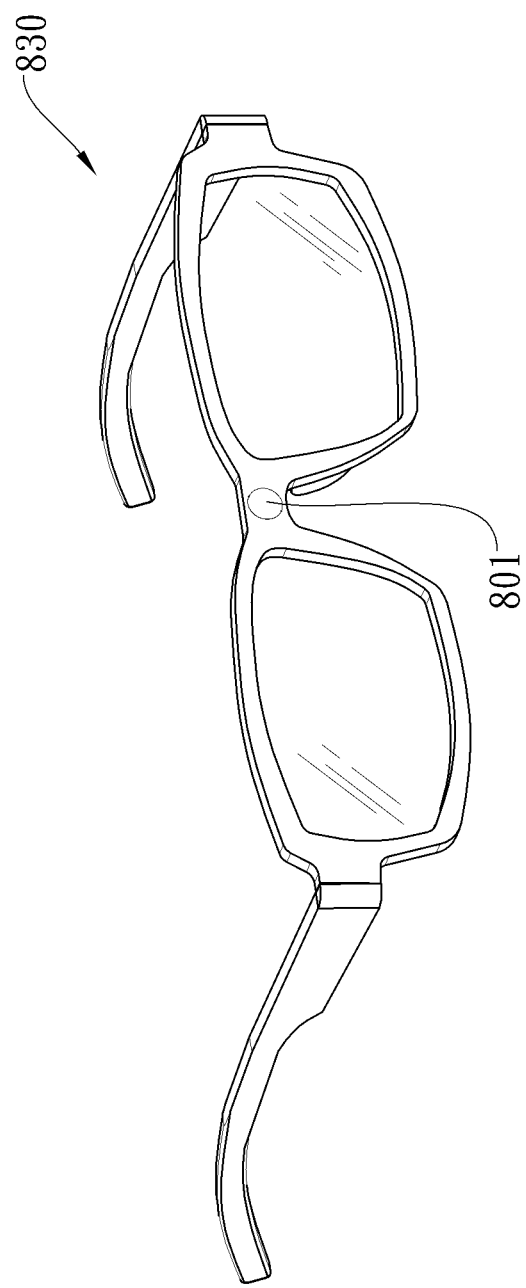
FIG. 8C shows a wearable device with an imaging apparatus of the present disclosure installed therein.

Referring to FIG. 8A, FIG. 8B, and FIG. 8C, an imaging apparatus 801 may be installed in a mobile device including, a smartphone 810, a tablet personal computer 820, or a wearable device 830. The three exemplary figures of different mobile devices are only exemplary for showing the imaging apparatus of the present disclosure installed in a mobile device, and the present disclosure is not limited thereto. Preferably, the mobile device can further comprise a control unit, a display unit, a storage unit, a random access memory unit (RAM) or a combination thereof.

Figure 9A:
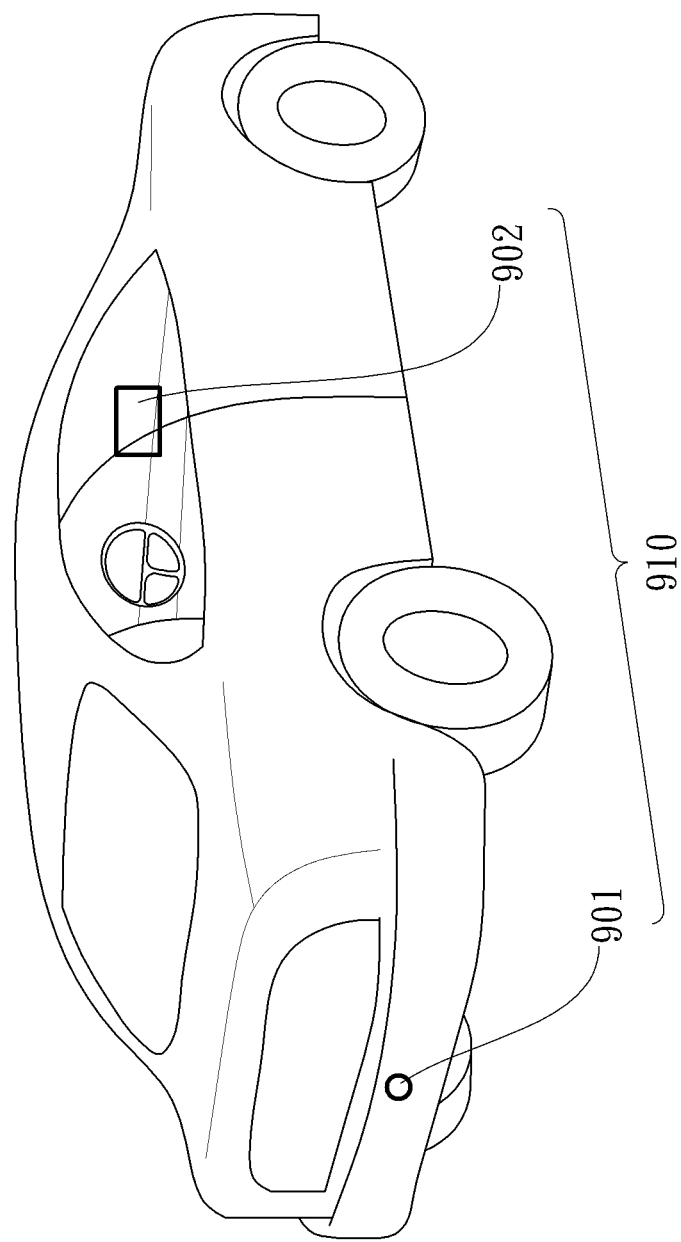
FIG. 9A shows a rear view camera with an imaging apparatus of the present disclosure installed therein.
Figure 9B:
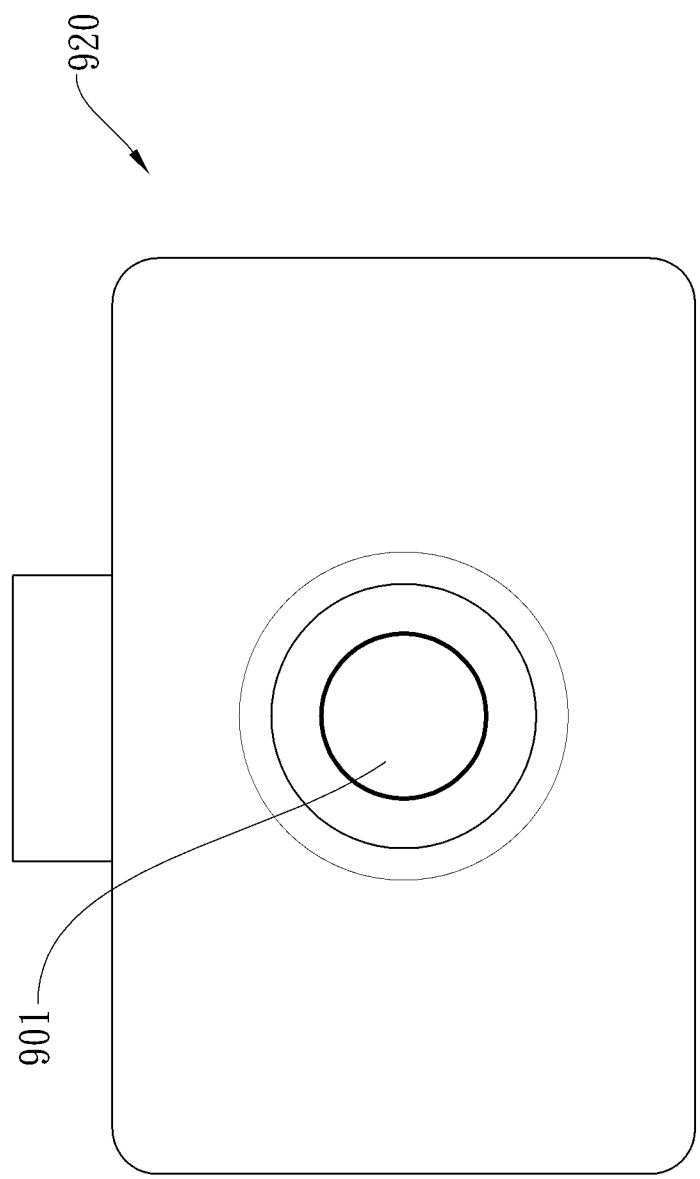
FIG. 9B shows a driving recording system with an imaging apparatus of the present disclosure installed therein.
Figure 9C:
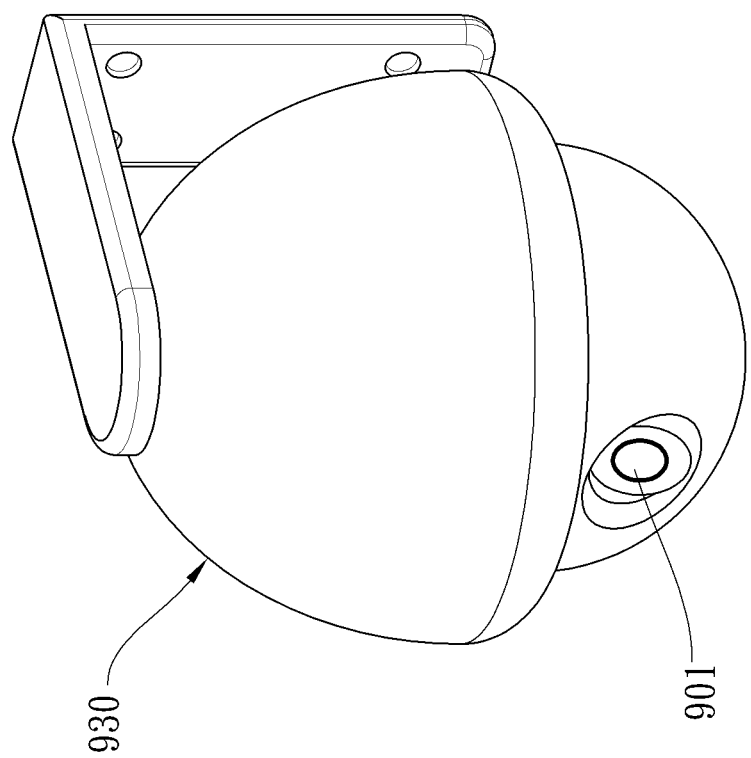
FIG. 9C shows a surveillance camera with an imaging apparatus of the present disclosure installed therein.

Referring to FIG. 9A, FIG. 9B and FIG. 9C, an imaging apparatus 901 may be installed in an electronic device (may be accompanied with a display screen 902) such as a rear view camera 910, a driving recording system 920, or a surveillance camera 930. The three exemplary figures of different electronic devices are only exemplary for showing the imaging apparatus of the present disclosure installed in an electronic device, and the present disclosure is not limited thereto. Preferably, the electronic device can further comprise a control unit, a display unit, a storage unit, a random access memory unit (RAM) or a combination thereof.

According to the above description of the present disclosure, the following 1st-7th specific embodiments are provided for further explanation.

1st Embodiment

Figure 1B:
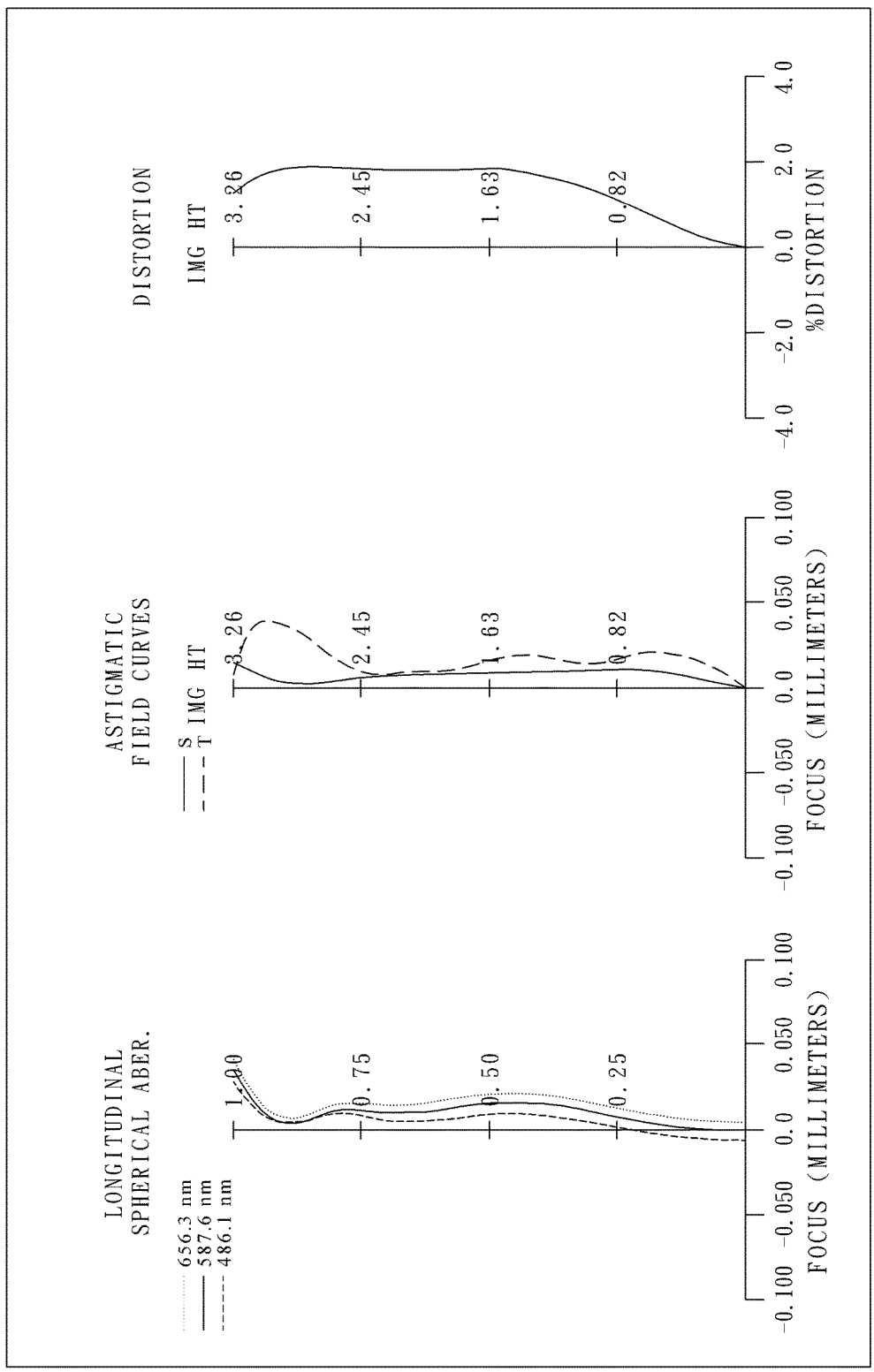
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus comprises an image lens assembly (not otherwise herein labeled) of the present disclosure and an image sensor 190. The image lens assembly comprises, in order from an object side to an image side, an aperture stop 100, a first lens element 110, a second lens element 120, a third lens element 130, a fourth lens element 140, a fifth lens element 150, and a sixth lens element 160, wherein each of the first through sixth lens elements (110-160) is a single and non-cemented lens element.

The first lens element 110 with positive refractive power has an object-side surface 111 being convex in a paraxial region thereof and an image-side surface 112 being concave in a paraxial region thereof, which are both aspheric, and the first lens element 110 is made of plastic.

The second lens element 120 with negative refractive power has an object-side surface 121 being convex in a paraxial region thereof and an image-side surface 122 being concave in a paraxial region thereof, which are both aspheric, and the second lens element 120 is made of plastic.

The third lens element 130 with positive refractive power has an object-side surface 131 being convex in a paraxial region thereof, an image-side surface 132 being concave in a paraxial region thereof with at least one convex critical point in an off-axial region thereof, both of the object-side surface 131 and the image-side surface 132 being aspheric; the third lens element 130 is made of plastic.

The fourth lens element 140 with negative refractive power has an object-side surface 141 being convex in a paraxial region thereof and an image-side surface 142 being concave in a paraxial region thereof, which are both aspheric, and the fourth lens element 140 is made of plastic.

The fifth lens element 150 with positive refractive power has an object-side surface 151 being convex in a paraxial region thereof, an image-side surface 152 being concave in a paraxial region thereof with at least one convex critical point in an off-axial region thereof, both of the object-side surface 151 and the image-side surface 152 being aspheric; the fifth lens element 150 is made of plastic.

The sixth lens element 160 with negative refractive power has an object-side surface 161 being convex in a paraxial region thereof, an image-side surface 162 being concave in a paraxial region thereof with at least one convex critical point in an off-axial region thereof, both of the object-side surface 161 and the image-side surface 162 being aspheric; the sixth lens element 160 is made of plastic.

The image lens assembly further comprises an IR-cut filter 170 located between the sixth lens element 160 and an image surface 180. The IR-cut filter 170 is made of glass and does not affect the focal length of the image lens assembly. The image sensor 190 is disposed on or near the image surface 180.

The detailed optical data of the 1st embodiment are shown in TABLE 1, wherein the units of the curvature radius, the thickness and the focal length are expressed in mm. Moreover, HFOV is half of a maximum field of view, and surfaces #0 to #16 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients. Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 4.36 mm, Fno = 1.95, HFOV = 36.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.408 | | | | |
| 2 | Lens 1 | 1.697 | ASP | 0.509 | Plastic | 1.545 | 56.0 | 4.69 |
| 3 | | 4.524 | ASP | 0.135 | | | | |
| 4 | Lens 2 | 7.141 | ASP | 0.230 | Plastic | 1.660 | 20.4 | −6.94 |
| 5 | | 2.756 | ASP | 0.163 | | | | |
| 6 | Lens 3 | 2.653 | ASP | 0.487 | Plastic | 1.544 | 55.9 | 6.75 |
| 7 | | 8.960 | ASP | 0.474 | | | | |
| 8 | Lens 4 | 8.319 | ASP | 0.320 | Plastic | 1.584 | 28.2 | −145.94 |
| 9 | | 7.472 | ASP | 0.457 | | | | |
| 10 | Lens 5 | 4.190 | ASP | 0.513 | Plastic | 1.544 | 55.9 | 8.46 |
| 11 | | 45.102 | ASP | 0.392 | | | | |
| 12 | Lens 6 | 3.797 | ASP | 0.350 | Plastic | 1.544 | 55.9 | −3.93 |
| 13 | | 1.324 | ASP | 0.350 | | | | |
| 14 | IR-cut Filter | Plano | | 0.210 | Glass | 1.517 | 64.2 | — |
| 15 | | Plano | | 0.402 | | | | |
| 16 | Image | Plano | | — | | | | |

Note:
Reference wavelength is d-line 587.6 nm.
The effective radius on surface #8 is 1.190 mm.

TABLE 2

Aspheric Coefficients

| Surface # | 2 | 3 | 4 | 5 | 6 | 7 |
|---|---|---|---|---|---|---|
| k = | −6.4207E−01 | −1.9973E+01 | 2.6589E+00 | −3.3602E+00 | 2.4834E+00 | −9.0000E+01 |
| A4 = | 1.8711E−02 | 1.6080E−02 | −7.6149E−02 | −9.2281E−02 | −1.0105E−01 | −2.4082E−02 |
| A6 = | −2.6526E−04 | 3.4180E−02 | 1.5470E−01 | 2.0300E−01 | 5.4832E−02 | −5.6818E−02 |
| A8 = | 1.3869E−02 | −1.2118E−01 | −2.9890E−01 | −3.5097E−01 | −2.1799E−02 | 1.7905E−01 |

TABLE 2-continued

| Aspheric Coefficients | | | | | |
|---|---|---|---|---|---|
| A10 = | −2.3039E−02 | 9.8734E−02 | 3.0873E−01 | 4.0023E−01 | −2.3799E−01 | −4.1260E−01 |
| A12 = | 1.5196E−02 | −2.3116E−02 | −1.3671E−01 | −2.1445E−01 | 4.5348E−01 | 4.4495E−01 |
| A14 = | −4.5223E−03 | −1.2134E−03 | 2.1513E−02 | 4.4965E−02 | −3.4277E−01 | −2.4547E−01 |
| A16 = | | | | | 9.4520E−02 | 5.4268E−02 |

| Surface # | 8 | 9 | 10 | 11 | 12 | 13 |
|---|---|---|---|---|---|---|
| k = | 2.0258E+01 | −3.6892E+00 | −6.6937E+01 | −1.2627E+01 | −9.0000E+01 | −8.2176E+00 |
| A4 = | −1.4655E−01 | −1.4593E−01 | 1.1522E−01 | 1.0755E−01 | −2.3000E−01 | −1.4802E−01 |
| A6 = | −1.8207E−02 | −2.5615E−02 | −2.3573E−01 | −1.3433E−01 | 9.6625E−02 | 7.4244E−02 |
| A8 = | 1.1969E−01 | 1.2124E−01 | 1.7639E−01 | 7.2447E−02 | −2.3105E−02 | −3.0435E−02 |
| A10 = | −2.3120E−01 | −1.4413E−01 | −9.3446E−02 | −2.7237E−02 | 4.6369E−03 | 8.3774E−03 |
| A12 = | 1.7251E−01 | 7.6130E−02 | 2.6517E−02 | 6.6367E−03 | −7.4045E−04 | −1.3674E−03 |
| A14 = | −6.2248E−02 | −1.3640E−02 | −2.9752E−03 | −8.7028E−04 | 7.0327E−05 | 1.1794E−04 |
| A16 = | 8.3737E−03 | | 4.7927E−05 | 4.5415E−05 | −2.7701E−06 | −4.1045E−06 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the image lens assembly is f, an f-number of the image lens assembly is Fno, half of a maximum field of view of the image lens assembly is HFOV, and these parameters have the following values: f=4.36 mm, Fno=1.95, and HFOV=36.4 degrees.

In the 1st embodiment, a maximum of axial distances between every two adjacent lens elements of the image lens assembly is ATmax, a minimum of axial distances between every two adjacent lens elements of the image lens assembly is ATmin, and they satisfy the condition: ATmax/ATmin=3.51.

In the 1st embodiment, a sum of axial distances between every two adjacent lens elements of the image lens assembly is ΣAT, an axial distance between the fourth lens element 140 and the fifth lens element 150 is T45, and they satisfy the condition: ΣAT/T45=3.55.

In the 1st embodiment, a central thickness of the third lens element 130 is CT3, a central thickness of the second lens element 120 is CT2, and they satisfy the condition: CT3/CT2=2.12.

In the 1st embodiment, a central thickness of the fourth lens element 140 is CT4, a displacement in parallel with an optical axis from an axial vertex on the image-side surface 142 of the fourth lens element 140 to a maximum effective diameter position on the image-side surface 142 of the fourth lens element 140 is Sag42, and they satisfy the condition: CT4/|Sag42|=1.56.

In the 1st embodiment, an axial distance between the object-side surface 111 of the first lens element 110 and the image-side surface 162 of the sixth lens element 160 is Td, an entrance pupil diameter of the image lens assembly is EPD, and they satisfy the condition: Td/EPD=1.80.

In the 1st embodiment, the axial distance between the object-side surface 111 of the first lens element 110 and the image-side surface 162 of the sixth lens element 160 is Td, the sum of axial distances between every two adjacent lens elements of the image lens assembly is ΣAT, and they satisfy the condition: Td/ΣAT=2.49.

In the 1st embodiment, a focal length of the first lens element 110 is f1, a focal length of the third lens element 130 is f3, and they satisfy the condition: f1/|f3|=0.69.

In the 1st embodiment, the focal length of the first lens element 110 is f1, a focal length of the fourth lens element 140 is f4, and they satisfy the condition: f1/|f4|=0.032.

In the 1st embodiment, the focal length of the image lens assembly is f, a curvature radius of the object-side surface 131 of the third lens element 130 is R5, and they satisfy the condition: f/R5=1.64.

In the 1st embodiment, the focal length of the image lens assembly is f, a curvature radius of the image-side surface 142 of the fourth lens element 140 is R8, and they satisfy the condition: f/R8=0.58.

In the 1st embodiment, the focal length of the image lens assembly is f, a curvature radius of the image-side surface 152 of the fifth lens element 150 is R10, and they satisfy the condition: f/R10=0.10.

In the 1st embodiment, the focal length of the image lens assembly is f, the focal length of the fourth lens element 140 is f4, a focal length of the fifth lens element 150 is f5, a focal length of the sixth lens element 160 is f6, and they satisfy the condition: |f/f4|+|f/f5|+|f/f6|=1.65.

2nd Embodiment

Figure 2A:
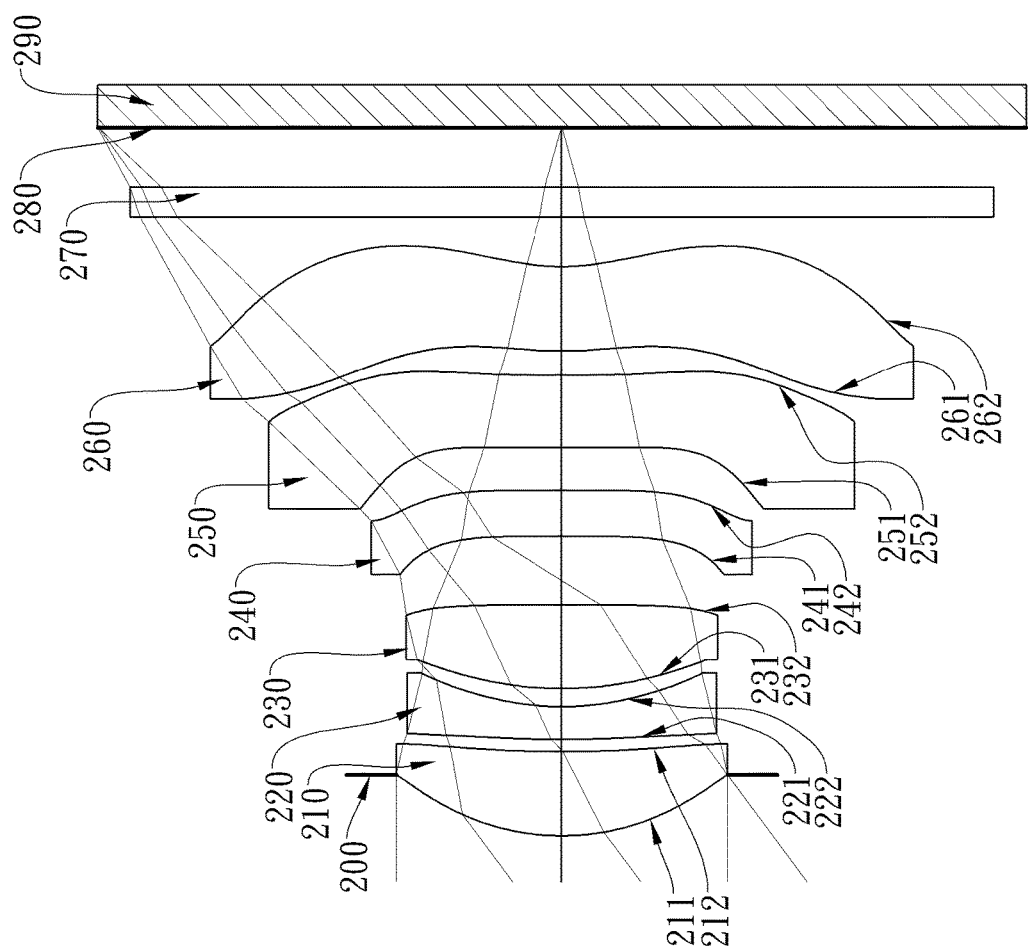
FIG. 2A is a schematic view of an imaging apparatus according to the 2nd embodiment of the present disclosure.
Figure 2B:
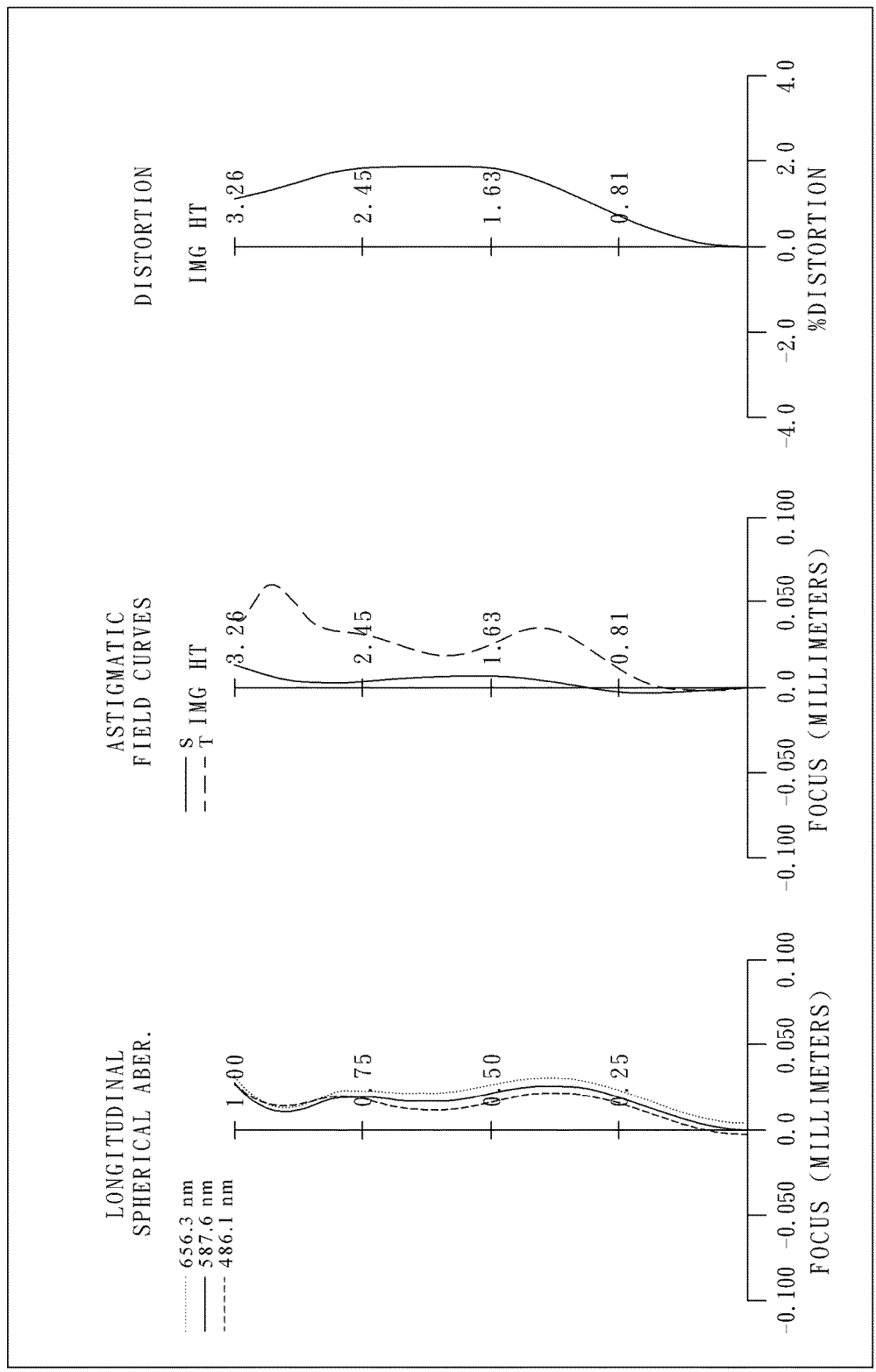
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus comprises an image lens assembly (not otherwise herein labeled) of the present disclosure and an image sensor 290. The image lens assembly comprises, in order from an object side to an image side, an aperture stop 200, a first lens element 210, a second lens element 220, a third lens element 230, a fourth lens element 240, a fifth lens element 250, and a sixth lens element 260, wherein each of the first through sixth lens elements (210-260) is a single and non-cemented lens element.

The first lens element 210 with positive refractive power has an object-side surface 211 being convex in a paraxial region thereof and an image-side surface 212 being concave in a paraxial region thereof, which are both aspheric, and the first lens element 210 is made of plastic.

The second lens element 220 with negative refractive power has an object-side surface 221 being convex in a paraxial region thereof and an image-side surface 222 being concave in a paraxial region thereof, which are both aspheric, and the second lens element 220 is made of plastic.

The third lens element 230 with positive refractive power has an object-side surface 231 being convex in a paraxial region thereof and an image-side surface 232 being convex in a paraxial region thereof, which are both aspheric, and the third lens element 230 is made of plastic.

The fourth lens element 240 with negative refractive power has an object-side surface 241 being concave in a paraxial region thereof and an image-side surface 242 being concave in a paraxial region thereof, which are both aspheric, and the fourth lens element 240 is made of plastic.

The fifth lens element 250 with negative refractive power has an object-side surface 251 being concave in a paraxial region thereof, an image-side surface 252 being concave in a paraxial region thereof with at least one convex critical point in an off-axial region thereof, both of the object-side surface 251 and the image-side surface 252 being aspheric; the fifth lens element 250 is made of plastic.

The sixth lens element 260 with negative refractive power has an object-side surface 261 being convex in a paraxial region thereof, an image-side surface 262 being concave in a paraxial region thereof with at least one convex critical point in an off-axial region thereof, both of the object-side surface 261 and the image-side surface 262 being aspheric, and the sixth lens element 260 is made of plastic.

The image lens assembly further comprises an IR-cut filter 270 located between the sixth lens element 260 and an image surface 280. The IR-cut filter 270 is made of glass and does not affect the focal length of the image lens assembly. The image sensor 290 is disposed on or near the image surface 280.

The detailed optical data of the 2nd embodiment are shown in TABLE 3, and the aspheric surface data are shown in TABLE 4, wherein the units of the curvature radius, the thickness and the focal length are expressed in mm, and HFOV is half of the maximum field of view.

TABLE 3

(2nd Embodiment)
f = 4.32 mm, Fno = 1.85, HFOV = 36.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.427 | | | | |
| 2 | Lens 1 | 1.702 | ASP | 0.593 | Plastic | 1.545 | 56.0 | 3.60 |
| 3 | | 11.304 | ASP | 0.085 | | | | |
| 4 | Lens 2 | 7.850 | ASP | 0.230 | Plastic | 1.660 | 20.4 | −3.79 |
| 5 | | 1.876 | ASP | 0.128 | | | | |
| 6 | Lens 3 | 2.414 | ASP | 0.594 | Plastic | 1.584 | 28.2 | 4.03 |
| 7 | | −88.140 | ASP | 0.483 | | | | |
| 8 | Lens 4 | −97.910 | ASP | 0.320 | Plastic | 1.639 | 23.5 | −77.42 |
| 9 | | 100.000 | ASP | 0.301 | | | | |
| 10 | Lens 5 | −82.409 | ASP | 0.511 | Plastic | 1.639 | 23.5 | −22.12 |
| 11 | | 17.091 | ASP | 0.173 | | | | |
| 12 | Lens 6 | 2.623 | ASP | 0.595 | Plastic | 1.544 | 55.9 | −7.81 |
| 13 | | 1.492 | ASP | 0.350 | | | | |
| 14 | IR-cut Filter | Plano | | 0.210 | Glass | 1.517 | 64.2 | |
| 15 | | Plano | | 0.419 | | | | |
| 16 | Image | Plano | | — | | | | |

Note:
Reference wavelength is d-line 587.6 nm.
The effective radius on surface #12 is 2.250 mm.

TABLE 4

Aspheric Coefficients

| Surface # | 2 | 3 | 4 | 5 | 6 | 7 |
|---|---|---|---|---|---|---|
| k = | −7.4127E−01 | 1.6771E+01 | 1.3882E+01 | −2.3125E+00 | 2.8181E+00 | 9.0000E+01 |
| A4 = | 1.5624E−02 | 2.8209E−02 | −5.6960E−02 | −7.2785E−02 | −7.2224E−02 | −1.3998E−04 |
| A6 = | 3.5172E−03 | 2.5805E−02 | 1.4272E−01 | 2.0129E−01 | 1.0689E−01 | −1.4465E−01 |
| A8 = | 7.3769E−03 | −1.2805E−01 | −3.1410E−01 | −3.6523E−01 | −2.3560E−01 | 4.4135E−01 |
| A10 = | −1.8053E−02 | 1.1089E−01 | 3.2406E−01 | 4.2242E−01 | 2.4796E−01 | −7.9713E−01 |
| A12 = | 1.2405E−02 | −3.5881E−02 | −1.5227E−01 | −2.4223E−01 | −1.3032E−01 | 7.8649E−01 |
| A14 = | −4.3991E−03 | 2.1226E−03 | 2.6767E−02 | 5.4284E−02 | 1.4399E−02 | −4.1353E−01 |
| A16 = | | | | | 5.1923E−03 | 8.9332E−02 |

| Surface # | 8 | 9 | 10 | 11 | 12 | 13 |
|---|---|---|---|---|---|---|
| k = | −1.0000E+00 | −1.0000E+00 | −5.0000E+01 | 1.9315E+01 | −5.3177E+00 | −6.3501E+00 |
| A4 = | −3.3927E−02 | 4.2102E−03 | 1.2628E−01 | 4.3489E−02 | −3.1354E−01 | −1.4896E−01 |
| A6 = | −3.3277E−01 | −2.8905E−01 | −3.3977E−01 | −6.5011E−02 | 2.1960E−01 | 8.6436E−02 |

TABLE 4-continued

| Aspheric Coefficients | | | | | | |
|---|---|---|---|---|---|---|
| A8 = | 8.3931E−01 | 4.2125E−01 | 3.2586E−01 | 2.1682E−02 | −1.0348E−01 | −3.9818E−02 |
| A10 = | −1.3248E+00 | −3.6771E−01 | −2.5523E−01 | −4.4136E−03 | 3.2347E−02 | 1.1737E−02 |
| A12 = | 1.1644E+00 | 1.7113E−01 | 1.2156E−01 | 1.0843E−03 | −6.0745E−03 | −2.0368E−03 |
| A14 = | −5.4586E−01 | −3.0149E−02 | −2.9659E−02 | −2.0505E−04 | 6.1251E−04 | 1.8637E−04 |
| A16 = | 1.0427E−01 | | 3.0190E−03 | 1.4415E−05 | −2.5412E−05 | −6.8268E−06 |

In the 2nd embodiment, the equation of the aspheric surface profiles of the aforementioned lens elements is the same as the equation from the 1st embodiment. Also, the definitions of the parameters shown in TABLE 5 below are the same as those stated in the 1st embodiment, but the values for the conditions in the 2nd embodiment are as specified below.

TABLE 5

| (2nd Embodiment) | | | |
|---|---|---|---|
| f [mm] | 4.32 | Td/ΣAT | 3.43 |
| f/EPD | 1.85 | f1/|f3| | 0.89 |
| HFOV [deg.] | 36.6 | f1/|f4| | 0.046 |
| ATmax/ATmin | 5.68 | f/R5 | 1.79 |
| ΣAT/T45 | 3.89 | f/R8 | 0.04 |
| CT3/CT2 | 2.58 | f/R10 | 0.25 |
| CT4/|Sag42| | 1.49 | |f/f4| + |f/f5| + |f/f6| | 0.80 |
| Td/EPD | 1.72 | | |

3rd Embodiment

Figure 3A:
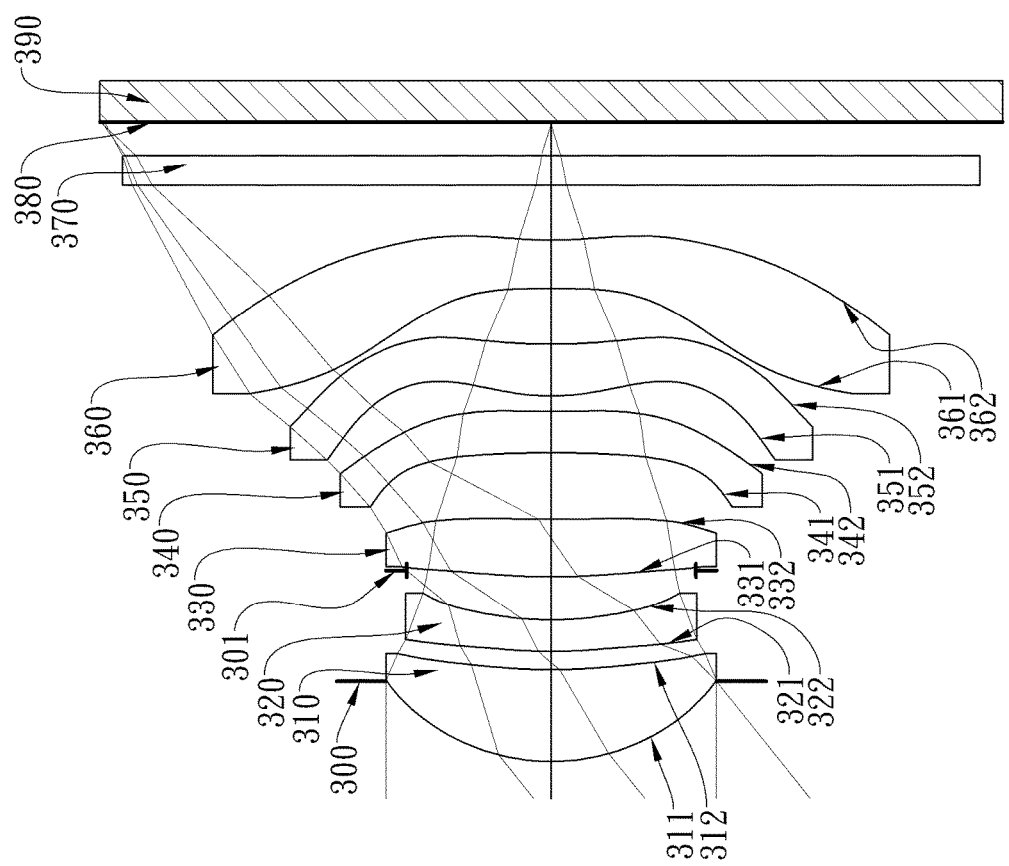
FIG. 3A is a schematic view of an imaging apparatus according to the 3rd embodiment of the present disclosure.
Figure 3B:
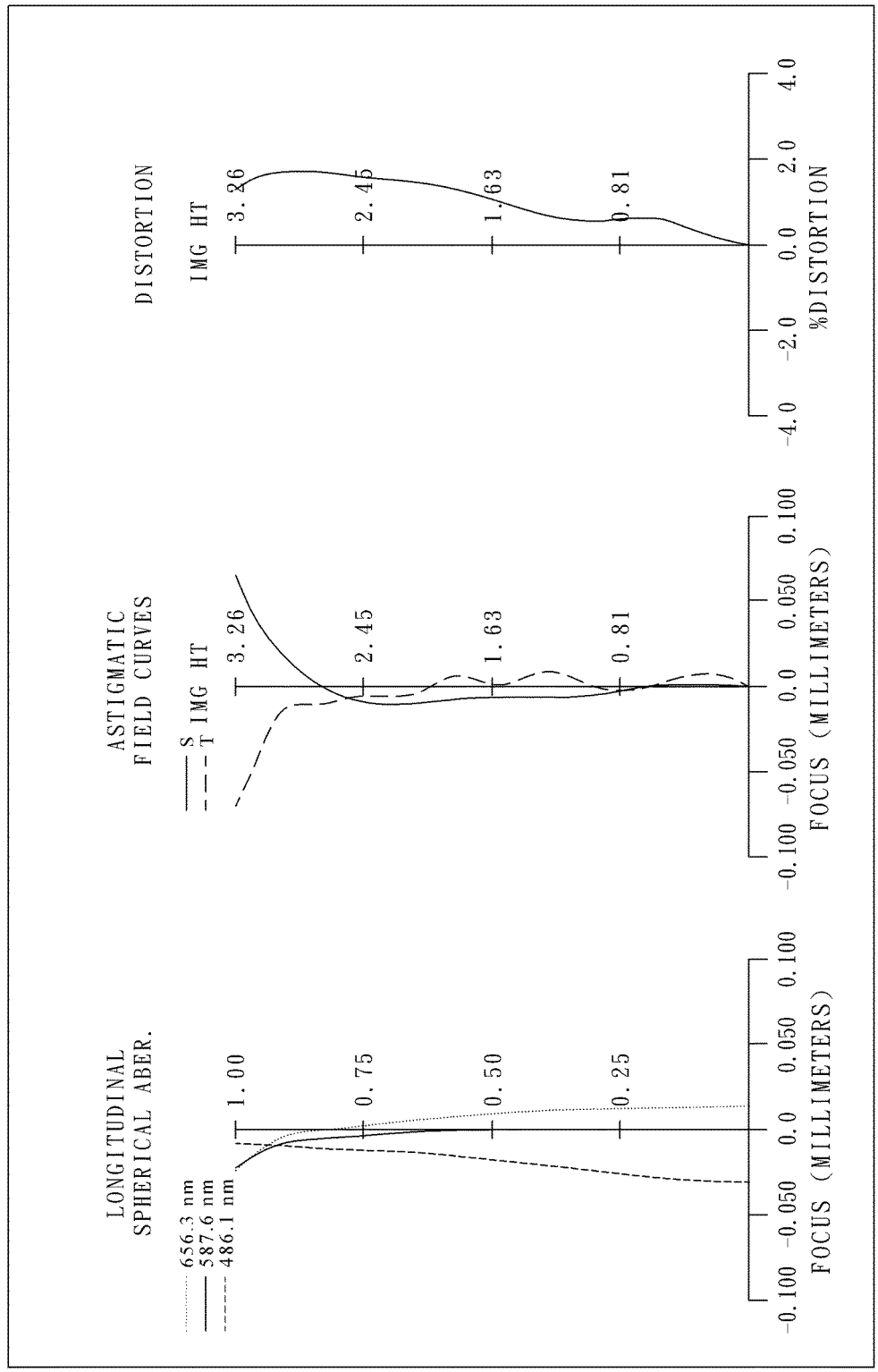
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus comprises an image lens assembly (not otherwise herein labeled) of the present disclosure and an image sensor 390. The image lens assembly comprises, in order from an object side to an image side, an aperture stop 300, a first lens element 310, a second lens element 320, a stop 301, a third lens element 330, a fourth lens element 340, a fifth lens element 350, and a sixth lens element 360, wherein each of the first through sixth lens elements (310-360) is a single and non-cemented lens element.

The first lens element 310 with positive refractive power has an object-side surface 311 being convex in a paraxial region thereof and an image-side surface 312 being concave in a paraxial region thereof, which are both aspheric, and the first lens element 310 is made of plastic.

The second lens element 320 with negative refractive power has an object-side surface 321 being convex in a paraxial region thereof and an image-side surface 322 being concave in a paraxial region thereof, which are both aspheric, and the second lens element 320 is made of plastic.

The third lens element 330 with positive refractive power has an object-side surface 331 being convex in a paraxial region thereof, an image-side surface 332 being concave in a paraxial region thereof with at least one convex critical point in an off-axial region thereof, both of the object-side surface 331 and the image-side surface 332 being aspheric; the third lens element 330 is made of plastic.

The fourth lens element 340 with negative refractive power has an object-side surface 341 being concave in a paraxial region thereof and an image-side surface 342 being concave in a paraxial region thereof, which are both aspheric, and the fourth lens element 340 is made of plastic.

The fifth lens element 350 with positive refractive power has an object-side surface 351 being convex in a paraxial region thereof, an image-side surface 352 being concave in a paraxial region thereof with at least one convex critical point in an off-axial region thereof, both of the object-side surface 351 and the image-side surface 352 being aspheric; the fifth lens element 350 is made of plastic.

The sixth lens element 360 with negative refractive power has an object-side surface 361 being concave in a paraxial region thereof, an image-side surface 362 being concave in a paraxial region thereof with at least one convex critical point in an off-axial region thereof, both of the object-side surface 361 and the image-side surface 362 being aspheric; the sixth lens element 360 is made of plastic.

The image lens assembly further comprises an IR-cut filter 370 located between the sixth lens element 360 and an image surface 380. The IR-cut filter 370 is made of glass and does not affect the focal length of the image lens assembly. The image sensor 390 is disposed on or near the image surface 380.

The detailed optical data of the 3rd embodiment are shown in TABLE 6, and the aspheric surface data are shown in TABLE 7, wherein the units of the curvature radius, the thickness and the focal length are expressed in mm, and HFOV is half of the maximum field of view.

TABLE 6

(3rd Embodiment)
f = 4.02 mm, Fno = 1.68, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.580 | | | | |
| 2 | Lens 1 | 1.542 | ASP | 0.665 | Plastic | 1.544 | 55.9 | 4.43 |
| 3 | | 3.631 | ASP | 0.132 | | | | |
| 4 | Lens 2 | 2.991 | ASP | 0.230 | Plastic | 1.660 | 20.4 | −12.96 |
| 5 | | 2.148 | ASP | 0.361 | | | | |
| 6 | Stop | Plano | | −0.046 | | | | |

TABLE 6-continued (3rd Embodiment)
f = 4.02 mm, Fno = 1.68, HFOV = 38.7 deg.

| Surface # | | Curvature Radius | | Thickness | Material | Index | Abbe # | Focal Length |
|---|---|---|---|---|---|---|---|---|
| 7 | Lens 3 | 4.612 | ASP | 0.419 | Plastic | 1.544 | 55.9 | 10.53 |
| 8 | | 22.996 | ASP | 0.480 | | | | |
| 9 | Lens 4 | −13.211 | ASP | 0.300 | Plastic | 1.660 | 20.4 | −6.62 |
| 10 | | 6.584 | ASP | 0.113 | | | | |
| 11 | Lens 5 | 1.598 | ASP | 0.377 | Plastic | 1.660 | 20.4 | 3.37 |
| 12 | | 5.124 | ASP | 0.406 | | | | |
| 13 | Lens 6 | −11.749 | ASP | 0.351 | Plastic | 1.639 | 23.5 | −3.43 |
| 14 | | 2.724 | ASP | 0.400 | | | | |
| 15 | IR-cut Filter | Plano | | 0.210 | Glass | 1.517 | 64.2 | — |
| 16 | | Plano | | 0.246 | | | | |
| 17 | Image | Plano | | — | | | | |

Note:
Reference wavelength is d-line 587.6 nm.
The effective radius on surface #6 is 1.050 mm.

TABLE 7

Aspheric Coefficients

| Surface # | 2 | 3 | 4 | 5 | 7 | 8 |
|---|---|---|---|---|---|---|
| k = | 2.3988E−01 | −4.0930E+01 | −2.0301E+01 | −1.3195E+00 | −2.5213E+01 | 4.1433E+01 |
| A4 = | −9.6663E−03 | −2.3974E−02 | −1.8173E−01 | −1.7315E−01 | −2.6954E−02 | −4.5946E−02 |
| A6 = | −8.5752E−03 | −2.8101E−03 | 1.7703E−01 | 2.1024E−01 | −2.3443E−02 | 3.3645E−02 |
| A8 = | 2.0593E−02 | 1.1219E−01 | 1.0075E−01 | 1.2510E−01 | 5.3246E−02 | −1.7812E−01 |
| A10 = | −2.9160E−02 | −1.7879E−01 | −3.0169E−01 | −3.6652E−01 | −7.4006E−02 | 2.8819E−01 |
| A12 = | 1.6102E−02 | 1.3686E−01 | 2.4022E−01 | 3.2194E−01 | 6.1226E−02 | −2.6320E−01 |
| A14 = | −2.7991E−03 | −4.1369E−02 | −7.4969E−02 | −1.0069E−01 | −1.5944E−02 | 1.2124E−01 |
| A16 = | | | | | | −1.9777E−02 |

| Surface # | 9 | 10 | 11 | 12 | 13 | 14 |
|---|---|---|---|---|---|---|
| k = | 6.1229E+01 | −7.2210E+00 | −6.0032E+00 | −7.4142E+01 | 1.9209E+01 | −1.3848E+00 |
| A4 = | −6.6272E−02 | −3.7755E−01 | −5.8112E−01 | 1.9578E−01 | −3.5162E−01 | −3.4320E−01 |
| A6 = | 5.8898E−02 | 3.4452E−01 | −1.4499E−01 | −4.8941E−01 | 2.0530E−01 | 2.3404E−01 |
| A8 = | 1.0866E−02 | −2.3962E−01 | −3.6988E−03 | 3.7281E−01 | −5.1698E−02 | −9.5303E−02 |
| A10 = | −2.2900E−01 | 9.6427E−02 | 1.2861E−01 | −1.4638E−01 | 5.9119E−03 | 2.3150E−02 |
| A12 = | 2.9413E−01 | −1.4462E−02 | −9.1209E−02 | 3.0832E−02 | −9.1996E−05 | −3.2854E−03 |
| A14 = | −1.6198E−01 | −1.6999E−03 | 2.5366E−02 | −3.2391E−03 | −3.9521E−05 | 2.5079E−04 |
| A16 = | 3.3102E−02 | 5.3708E−04 | −2.5309E−03 | 1.3076E−04 | 2.5565E−06 | −7.9366E−06 |

In the 3rd embodiment, the equation of the aspheric surface profiles of the aforementioned lens elements is the same as the equation from the 1st embodiment. Also, the definitions of the parameters shown in TABLE 8 below are the same as those stated in the 1st embodiment, but the values for the conditions in the 3rd embodiment are as specified below.

TABLE 8

(3rd Embodiment)

| f [mm] | 4.02 | Td/ΣAT | 2.62 |
|---|---|---|---|
| f/EPD | 1.68 | f1/|f3| | 0.42 |
| HFOV [deg.] | 38.7 | f1/|f4| | 0.669 |
| ATmax/ATmin | 4.25 | f/R5 | 0.87 |
| ΣAT/T45 | 12.80 | f/R8 | 0.61 |
| CT3/CT2 | 1.82 | f/R10 | 0.78 |
| CT4/|Sag42| | 0.76 | |f/f4| + |f/f5| + |f/f6| | 2.97 |
| Td/EPD | 1.58 | | |

4th Embodiment

Figure 4A:
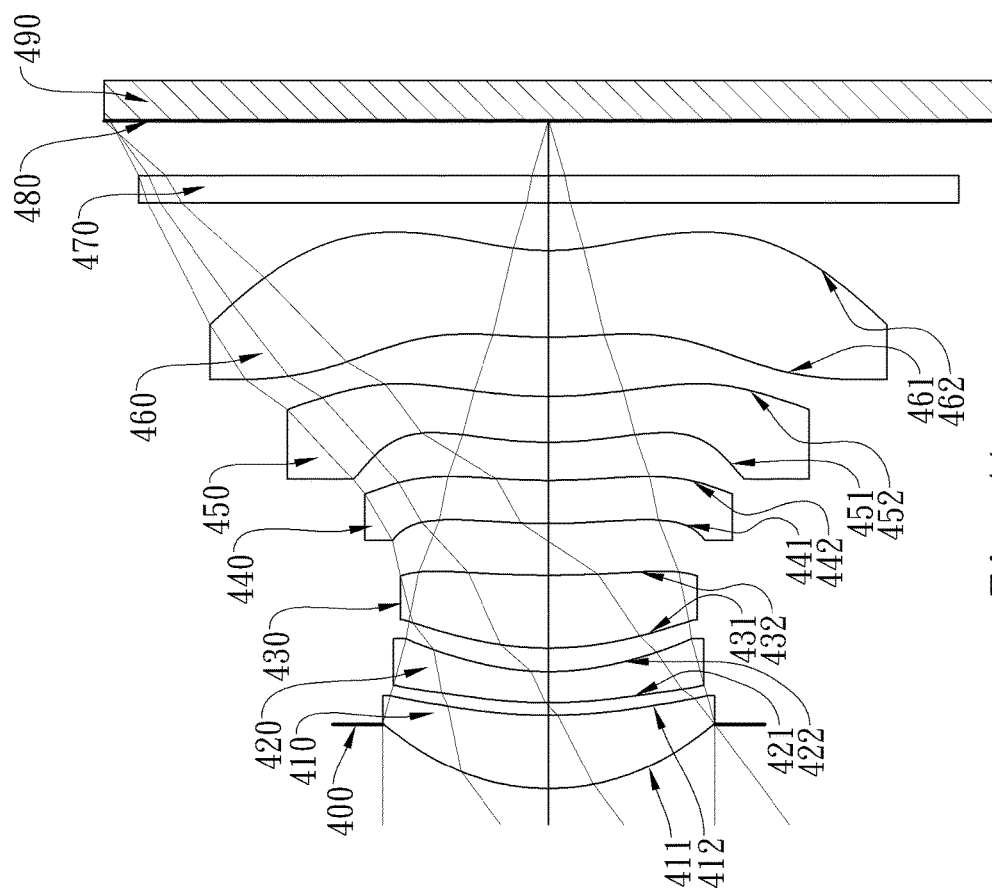
FIG. 4A is a schematic view of an imaging apparatus according to the 4th embodiment of the present disclosure.
Figure 4B:
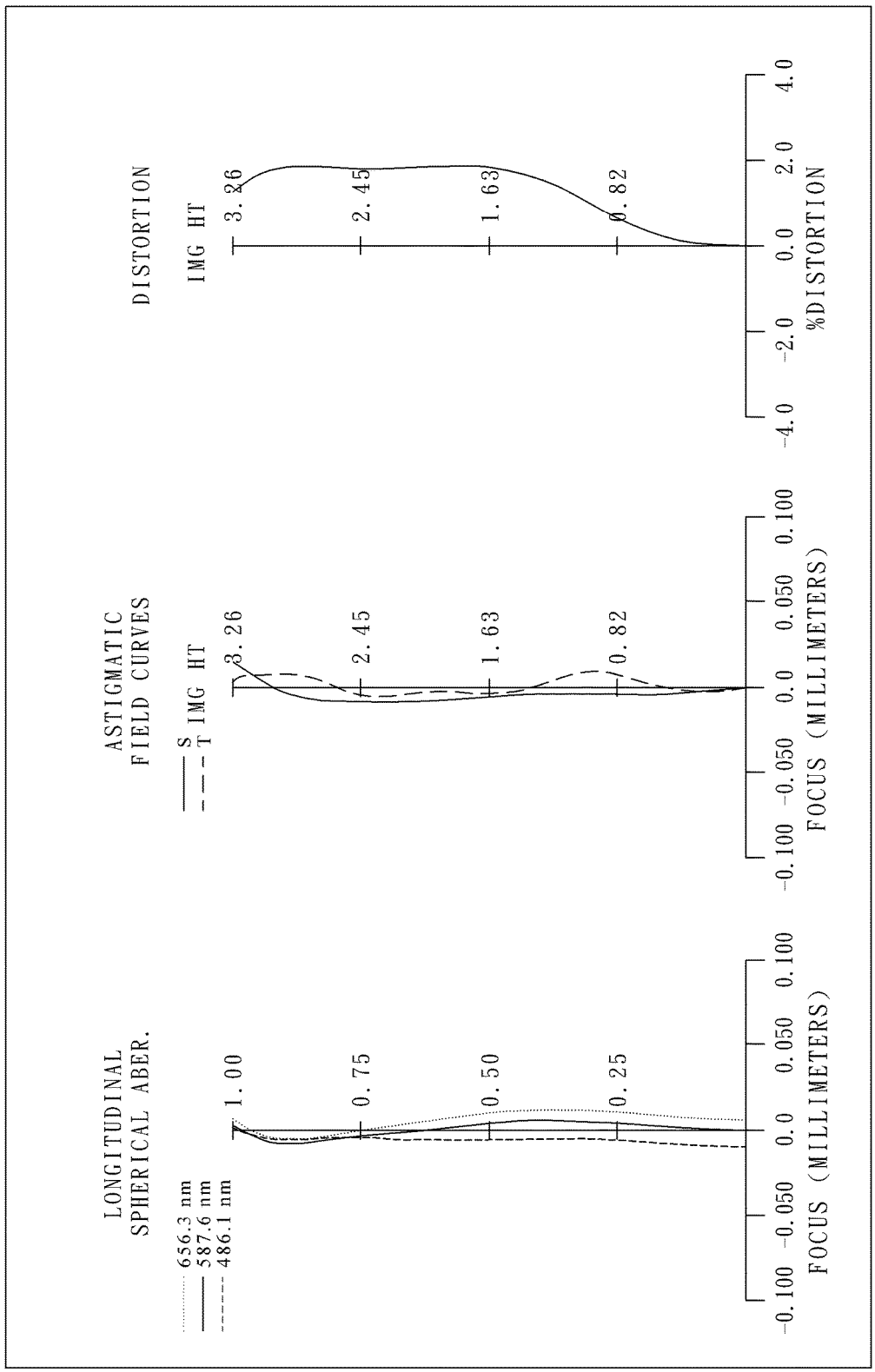
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus comprises an image lens assembly (not otherwise herein labeled) of the present disclosure and an image sensor 490. The image lens assembly comprises, in order from an object side to an image side, an aperture stop 400, a first lens element 410, a second lens element 420, a third lens element 430, a fourth lens element 440, a fifth lens element 450, and a sixth lens element 460, wherein each of the first through sixth lens elements (410-460) is a single and non-cemented lens element.

The first lens element 410 with positive refractive power has an object-side surface 411 being convex in a paraxial region thereof and an image-side surface 412 being concave in a paraxial region thereof, which are both aspheric, and the first lens element 410 is made of plastic.

The second lens element 420 with negative refractive power has an object-side surface 421 being convex in a paraxial region thereof and an image-side surface 422 being concave in a paraxial region thereof, which are both aspheric, and the second lens element 420 is made of plastic.

The third lens element 430 with positive refractive power has an object-side surface 431 being convex in a paraxial region thereof, an image-side surface 432 being concave in a paraxial region thereof with at least one convex critical point in an off-axial region thereof, both of the object-side surface 431 and the image-side surface 432 being aspheric; the third lens element 430 is made of plastic.

The fourth lens element 440 with positive refractive power has an object-side surface 441 being convex in a paraxial region thereof and an image-side surface 442 being concave in a paraxial region thereof, which are both aspheric, and the fourth lens element 440 is made of plastic.

The fifth lens element 450 with positive refractive power has an object-side surface 451 being convex in a paraxial region thereof, an image-side surface 452 being concave in a paraxial region thereof with at least one convex critical point in an off-axial region thereof, both of the object-side surface 451 and the image-side surface 452 being aspheric; the fifth lens element 450 is made of plastic.

The sixth lens element 460 with negative refractive power has an object-side surface 461 being convex in a paraxial region thereof, an image-side surface 462 being concave in a paraxial region thereof with at least one convex critical point in an off-axial region thereof, both of the object-side surface 461 and the image-side surface 462 being aspheric; the sixth lens element 460 is made of plastic.

The image lens assembly further comprises an IR-cut filter 470 located between the sixth lens element 460 and an image surface 480. The IR-cut filter 470 is made of glass and does not affect the focal length of the image lens assembly. The image sensor 490 is disposed on or near the image surface 480.

The detailed optical data of the 4th embodiment are shown in TABLE 9, and the aspheric surface data are shown in TABLE 10, wherein the units of the curvature radius, the thickness and the focal length are expressed in mm, and HFOV is half of the maximum field of view.

TABLE 9

(4th Embodiment)
f = 4.32 mm, Fno = 1.76, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.480 | | | | |
| 2 | Lens 1 | 1.731 | ASP | 0.548 | Plastic | 1.544 | 55.9 | 5.02 |
| 3 | | 4.209 | ASP | 0.092 | | | | |
| 4 | Lens 2 | 3.403 | ASP | 0.230 | Plastic | 1.660 | 20.4 | −7.08 |
| 5 | | 1.916 | ASP | 0.175 | | | | |
| 6 | Lens 3 | 2.368 | ASP | 0.540 | Plastic | 1.544 | 55.9 | 6.50 |
| 7 | | 6.603 | ASP | 0.383 | | | | |
| 8 | Lens 4 | 4.356 | ASP | 0.320 | Plastic | 1.639 | 23.5 | 2492.07 |
| 9 | | 4.243 | ASP | 0.288 | | | | |
| 10 | Lens 5 | 2.770 | ASP | 0.340 | Plastic | 1.544 | 55.9 | 45.49 |
| 11 | | 2.985 | ASP | 0.438 | | | | |
| 12 | Lens 6 | 3.068 | ASP | 0.644 | Plastic | 1.535 | 55.8 | −8.63 |
| 13 | | 1.709 | ASP | 0.350 | | | | |
| 14 | IR-cut Filter | Plano | | 0.210 | Glass | 1.517 | 64.2 | — |
| 15 | | Plano | | 0.406 | | | | |
| 16 | Image | Plano | | — | | | | |

Note:
Reference wavelength is d-line 587.6 nm.
The effective radius on surface #8 is 1.160 mm.

TABLE 10

Aspheric Coefficients

| Surface # | 2 | 3 | 4 | 5 | 6 | 7 |
|---|---|---|---|---|---|---|
| k = | −7.0263E−01 | −1.2244E+01 | −2.1401E+00 | −2.5786E+00 | 2.7056E+00 | −8.2334E+01 |
| A4 = | 1.6032E−02 | 2.5740E−02 | −7.1300E−02 | −8.2132E−02 | −8.4890E−02 | −2.0142E−02 |
| A6 = | 4.6033E−03 | 2.4951E−02 | 1.4321E−01 | 2.1604E−01 | 7.9241E−02 | −6.9028E−03 |
| A8 = | −4.8421E−03 | −1.3257E−01 | −3.2947E−01 | −4.2989E−01 | −1.4973E−01 | 3.7622E−02 |
| A10 = | −1.3658E−05 | 1.2287E−01 | 3.5146E−01 | 4.9788E−01 | 1.4887E−01 | −1.2871E−01 |
| A12 = | 1.1216E−03 | −3.7000E−02 | −1.6224E−01 | −2.7825E−01 | −1.1949E−01 | 1.5015E−01 |
| A14 = | −5.4552E−04 | 1.2785E−03 | 2.6691E−02 | 5.8445E−02 | 6.6146E−02 | −8.9273E−02 |

| Surface # | 8 | 9 | 10 | 11 | 12 | 13 |
|---|---|---|---|---|---|---|
| k = | 1.1448E+01 | −1.0929E+01 | −2.3628E+01 | −5.0417E+01 | −3.9216E+01 | −9.2733E+00 |
| A4 = | −1.4781E−01 | −1.1832E−01 | 9.1865E−03 | 4.1988E−02 | −1.7326E−01 | −8.6467E−02 |
| A6 = | 8.6702E−02 | 3.9795E−02 | −6.5698E−02 | −5.1472E−02 | 5.7948E−02 | 2.8942E−02 |
| A8 = | −2.2889E−01 | −1.8049E−02 | −2.8243E−02 | −3.1383E−04 | −2.0134E−03 | −8.9679E−03 |
| A10 = | 3.7798E−01 | −1.7672E−03 | 5.1040E−02 | 1.1223E−02 | −2.6977E−03 | 1.7928E−03 |

TABLE 10-continued

| Aspheric Coefficients | | | | | |
|---|---|---|---|---|---|
| A12 = | −4.3049E−01 | 3.5731E−03 | −3.9208E−02 | −4.3033E−03 | 6.5183E−04 | −1.9997E−04 |
| A14 = | 2.5955E−01 | −2.5496E−04 | 1.4439E−02 | 6.9435E−04 | −6.2527E−05 | 1.0713E−05 |
| A16 = | | −6.8284E−02 | −1.8236E−03 | −4.4261E−05 | 2.2378E−06 | −1.7205E−07 |

In the 4th embodiment, the equation of the aspheric surface profiles of the aforementioned lens elements is the same as the equation from the 1st embodiment. Also, the definitions of the parameters shown in TABLE 11 below are the same as those stated in the 1st embodiment, but the values for the conditions in the 4th embodiment are as specified below.

TABLE 11

(4th Embodiment)

| f [mm] | 4.32 | Td/ΣAT | 2.91 |
|---|---|---|---|
| f/EPD | 1.76 | f1/|f3| | 0.77 |
| HFOV [deg.] | 36.7 | f1/|f4| | 0.002 |
| ATmax/ATmin | 4.76 | f/R5 | 1.82 |
| ΣAT/T45 | 4.78 | f/R8 | 1.02 |
| CT3/CT2 | 2.35 | f/R10 | 1.45 |
| CT4/|Sag42| | 3.24 | |f/f4| + |f/f5| + |f/f6| | 0.60 |
| Td/EPD | 1.63 | | |

5th Embodiment

Figure 5A:
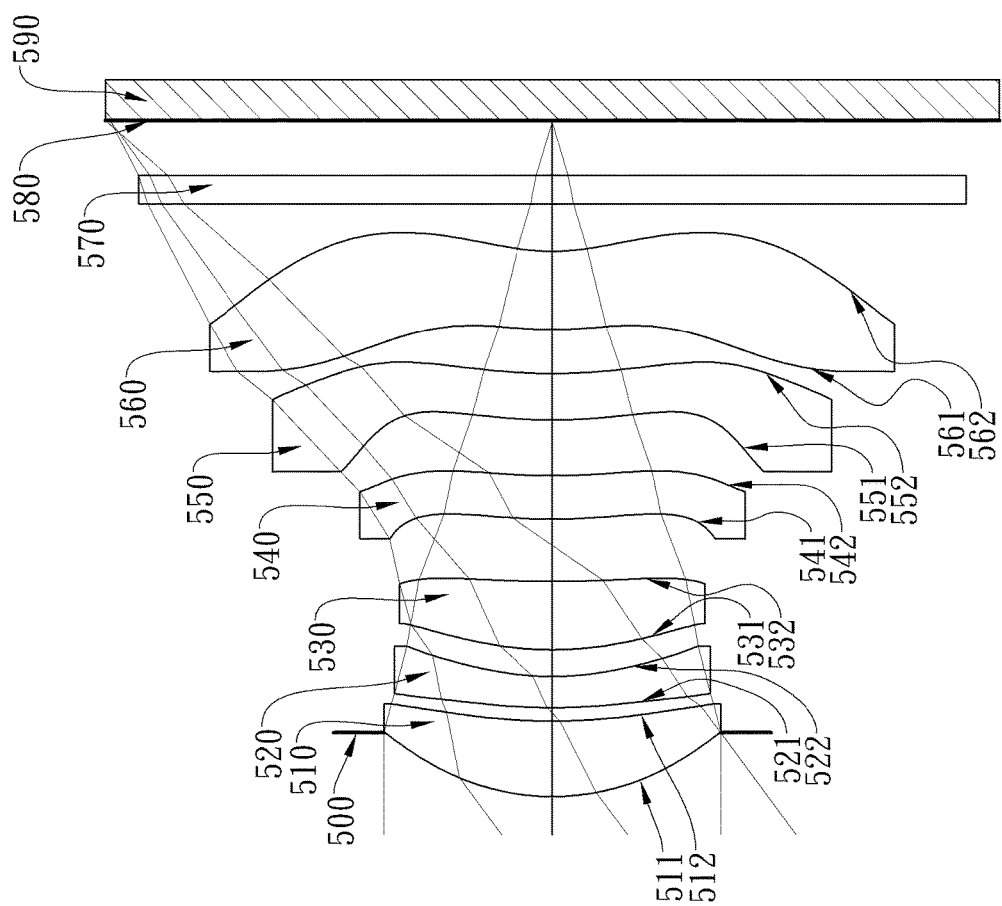
FIG. 5A is a schematic view of an imaging apparatus according to the 5th embodiment of the present disclosure.
Figure 5B:
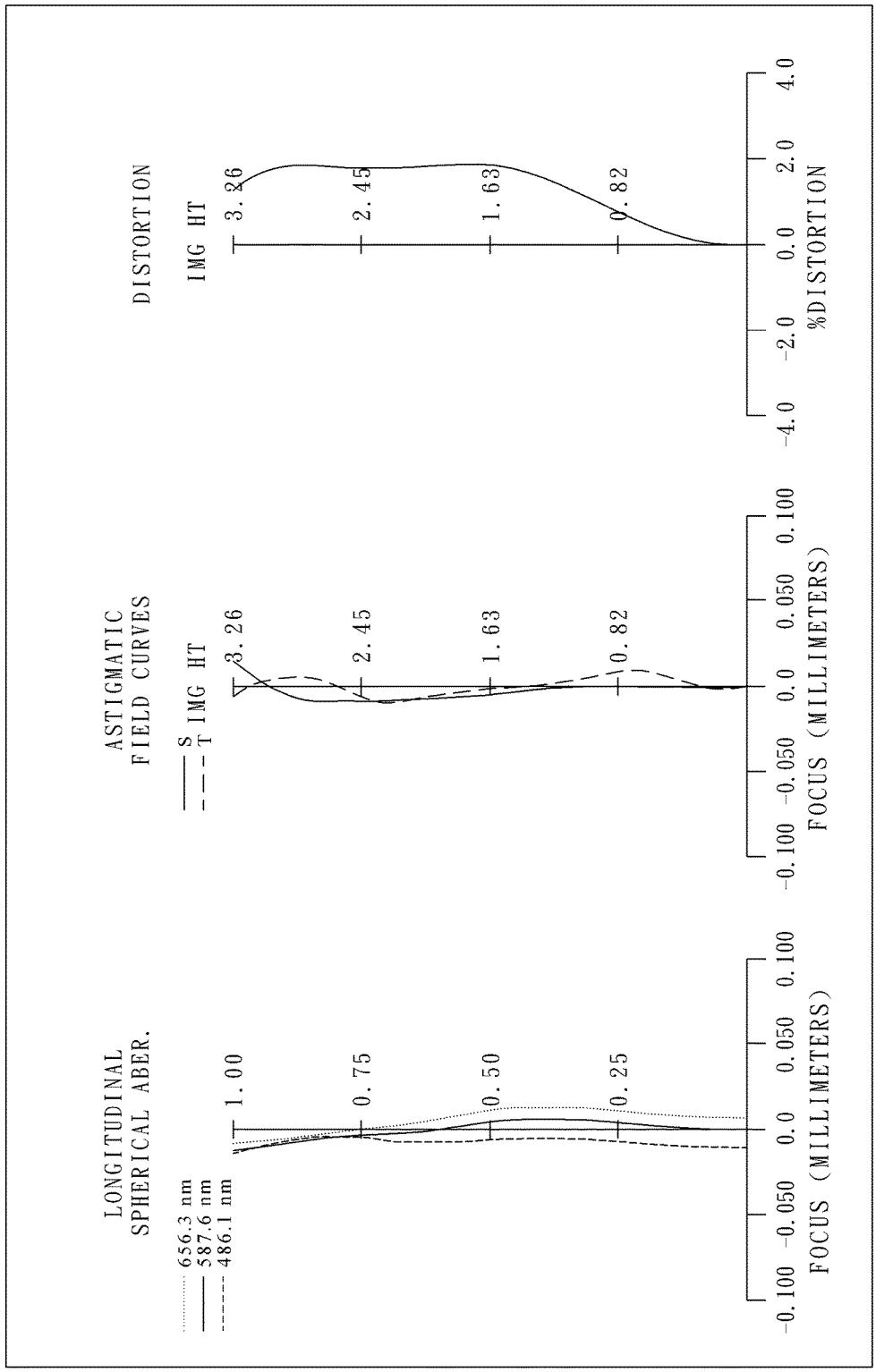
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus comprises an image lens assembly (not otherwise herein labeled) of the present disclosure and an image sensor 590. The image lens assembly comprises, in order from an object side to an image side, an aperture stop 500, a first lens element 510, a second lens element 520, a third lens element 530, a fourth lens element 540, a fifth lens element 550, and a sixth lens element 560, wherein each of the first through sixth lens elements (510-560) is a single and non-cemented lens element.

The first lens element 510 with positive refractive power has an object-side surface 511 being convex in a paraxial region thereof and an image-side surface 512 being concave in a paraxial region thereof, which are both aspheric, and the first lens element 510 is made of plastic.

The second lens element 520 with negative refractive power has an object-side surface 521 being convex in a paraxial region thereof and an image-side surface 522 being concave in a paraxial region thereof, which are both aspheric, and the second lens element 520 is made of plastic.

The third lens element 530 with positive refractive power has an object-side surface 531 being convex in a paraxial region thereof, an image-side surface 532 being concave in a paraxial region thereof with at least one convex critical point in an off-axial region thereof, both of the object-side surface 531 and the image-side surface 532 being aspheric; the third lens element 530 is made of plastic.

The fourth lens element 540 with positive refractive power has an object-side surface 541 being convex in a paraxial region thereof and an image-side surface 542 being concave in a paraxial region thereof, which are both aspheric, and the fourth lens element 540 is made of plastic.

The fifth lens element 550 with negative refractive power has an object-side surface 551 being convex in a paraxial region thereof, an image-side surface 552 being concave in a paraxial region thereof with at least one convex critical point in an off-axial region thereof, both of the object-side surface 551 and the image-side surface 552 being aspheric; the fifth lens element 550 is made of plastic.

The sixth lens element 560 with negative refractive power has an object-side surface 561 being convex in a paraxial region thereof, an image-side surface 562 being concave in a paraxial region thereof with at least one convex critical point in an off-axial region thereof, both of the object-side surface 561 and the image-side surface 562 being aspheric; the sixth lens element 560 is made of plastic.

The image lens assembly further comprises an IR-cut filter 570 located between the sixth lens element 560 and an image surface 580. The IR-cut filter 570 is made of glass and does not affect the focal length of the image lens assembly. The image sensor 590 is disposed on or near the image surface 580.

The detailed optical data of the 5th embodiment are shown in TABLE 12, and the aspheric surface data are shown in TABLE 13, wherein the units of the curvature radius, the thickness and the focal length are expressed in mm, and HFOV is half of the maximum field of view.

TABLE 12

(5th Embodiment)
f = 4.35 mm, Fno = 1.75, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.469 | | | | |
| 2 | Lens 1 | 1.773 | ASP | 0.556 | Plastic | 1.544 | 55.9 | 4.94 |
| 3 | | 4.633 | ASP | 0.098 | | | | |
| 4 | Lens 2 | 3.988 | ASP | 0.230 | Plastic | 1.660 | 20.4 | −7.04 |
| 5 | | 2.097 | ASP | 0.197 | | | | |
| 6 | Lens 3 | 2.461 | ASP | 0.508 | Plastic | 1.544 | 55.9 | 6.49 |
| 7 | | 7.555 | ASP | 0.459 | | | | |

TABLE 12-continued (5th Embodiment)
f = 4.35 mm, Fno = 1.75, HFOV = 36.5 deg.

| Surface # | | Curvature Radius | | Thickness | Material | Index | Abbe # | Focal Length |
|---|---|---|---|---|---|---|---|---|
| 8 | Lens 4 | 3.892 | ASP | 0.320 | Plastic | 1.639 | 23.5 | 54.08 |
| 9 | | 4.246 | ASP | 0.411 | | | | |
| 10 | Lens 5 | 3.520 | ASP | 0.341 | Plastic | 1.544 | 55.9 | −50.14 |
| 11 | | 3.011 | ASP | 0.328 | | | | |
| 12 | Lens 6 | 2.401 | ASP | 0.578 | Plastic | 1.535 | 55.8 | −9.79 |
| 13 | | 1.508 | ASP | 0.350 | | | | |
| 14 | IR-cut Filter | Plano | | 0.210 | Glass | 1.517 | 64.2 | — |
| 15 | | Plano | | 0.405 | | | | |
| 16 | Image | Plano | | — | | | | |

Note:
Reference wavelength is d-line 587.6 nm.
The effective radius on surface #8 is 1.200 mm.

TABLE 13

Aspheric Coefficients

| Surface # | 2 | 3 | 4 | 5 | 6 | 7 |
|---|---|---|---|---|---|---|
| k = | −7.4518E−01 | −1.5604E+01 | −2.0537E+00 | −2.9128E+00 | 2.9262E+00 | −9.0000E+01 |
| A4 = | 1.6659E−02 | 2.5330E−02 | −6.8710E−02 | −7.8633E−02 | −8.2200E−02 | −2.3456E−02 |
| A6 = | −8.2422E−04 | 2.5218E−02 | 1.3440E−01 | 1.8599E−01 | 6.0945E−02 | −8.3300E−03 |
| A8 = | 8.8885E−03 | −1.2955E−01 | −3.1061E−01 | −3.6763E−01 | −1.1277E−01 | 3.8825E−02 |
| A10 = | −1.7872E−02 | 1.1294E−01 | 3.2897E−01 | 4.2667E−01 | 9.4077E−02 | −1.1427E−01 |
| A12 = | 1.1945E−02 | −2.9185E−02 | −1.4994E−01 | −2.3830E−01 | −6.5922E−02 | 1.2182E−01 |
| A14 = | −3.1187E−03 | −8.7342E−04 | 2.4304E−02 | 5.0437E−02 | 3.4548E−02 | −6.7011E−02 |
| A16 = | | | | | −1.2290E−02 | 1.4262E−02 |

| Surface # | 8 | 9 | 10 | 11 | 12 | 13 |
|---|---|---|---|---|---|---|
| k = | 8.5109E+00 | −6.8732E+00 | −7.4631E+01 | −8.6416E+01 | −3.4648E+01 | −8.5448E+00 |
| A4 = | −1.3583E−01 | −9.5672E−02 | 7.1806E−02 | 3.1736E−02 | −2.2385E−01 | −1.1918E−01 |
| A6 = | 5.3202E−02 | 1.6116E−02 | −1.3535E−01 | −1.4245E−02 | 1.1422E−01 | 5.8791E−02 |
| A8 = | −1.7130E−01 | −1.1200E−02 | 5.1718E−02 | −2.8399E−02 | −3.1437E−02 | −2.4374E−02 |
| A10 = | 2.7968E−01 | 1.4659E−03 | −7.5270E−03 | 1.9879E−02 | 5.8384E−03 | 6.4571E−03 |
| A12 = | −3.1242E−01 | −4.4049E−04 | −1.4458E−02 | −5.3774E−03 | −7.5702E−04 | −1.0085E−03 |
| A14 = | 1.8162E−01 | 7.2481E−04 | 8.8845E−03 | 6.9493E−04 | 6.1780E−05 | 8.5238E−05 |
| A16 = | −4.5853E−02 | | −1.3463E−03 | −3.6413E−05 | −2.3303E−06 | −2.9981E−06 |

In the 5th embodiment, the equation of the aspheric surface profiles of the aforementioned lens elements is the same as the equation from the 1st embodiment. Also, the definitions of the parameters shown in TABLE 14 below are the same as those stated in the 1st embodiment, but the values for the conditions in the 5th embodiment are as specified below.

TABLE 14

(5th Embodiment)

| f [mm] | 4.35 | Td/ΣAT | 2.70 |
|---|---|---|---|
| f/EPD | 1.75 | |f1/f3| | 0.76 |
| HFOV [deg.] | 36.5 | |f1/f4| | 0.091 |
| ATmax/ATmin | 4.68 | f/R5 | 1.77 |
| ΣAT/T45 | 3.63 | f/R8 | 1.02 |
| CT3/CT2 | 2.21 | f/R10 | 1.44 |
| CT4/|Sag42| | 2.74 | |f/f4| + |f/f5| + |f/f6| | 0.61 |
| Td/EPD | 1.62 | | |

6th Embodiment

Figure 6A:
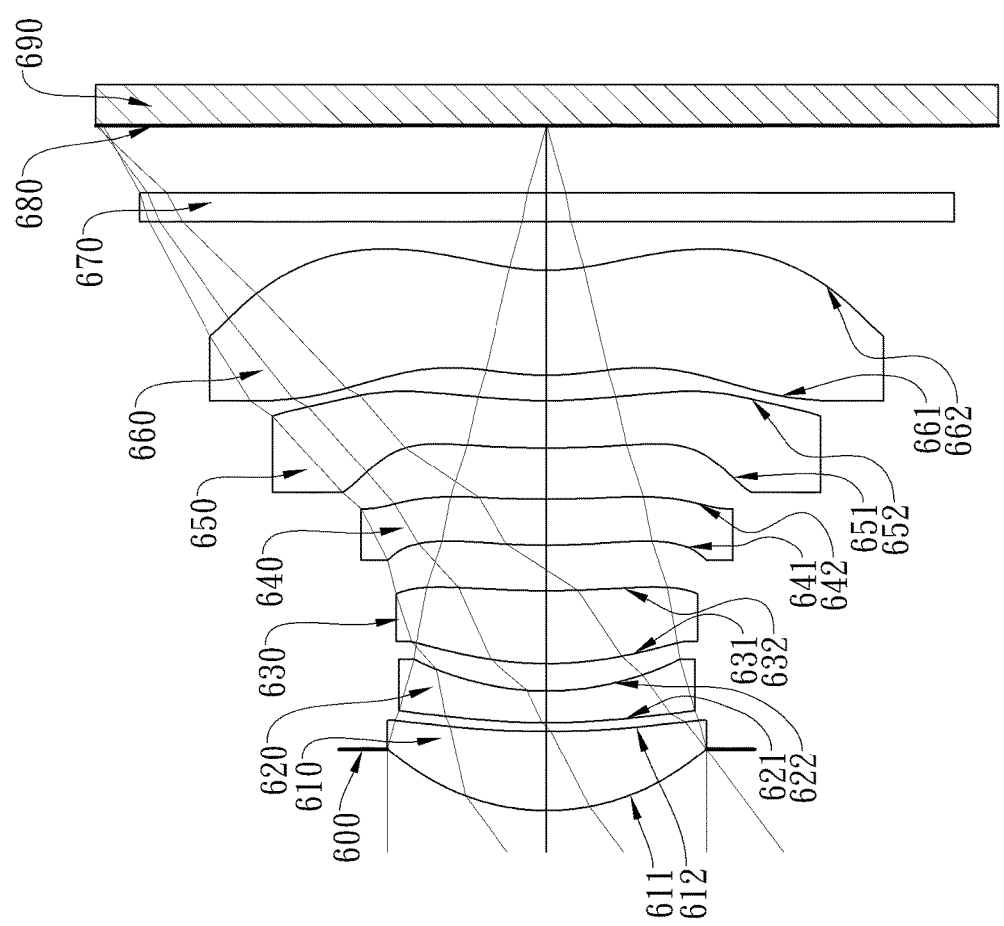
FIG. 6A is a schematic view of an imaging apparatus according to the 6th embodiment of the present disclosure.
Figure 6B:
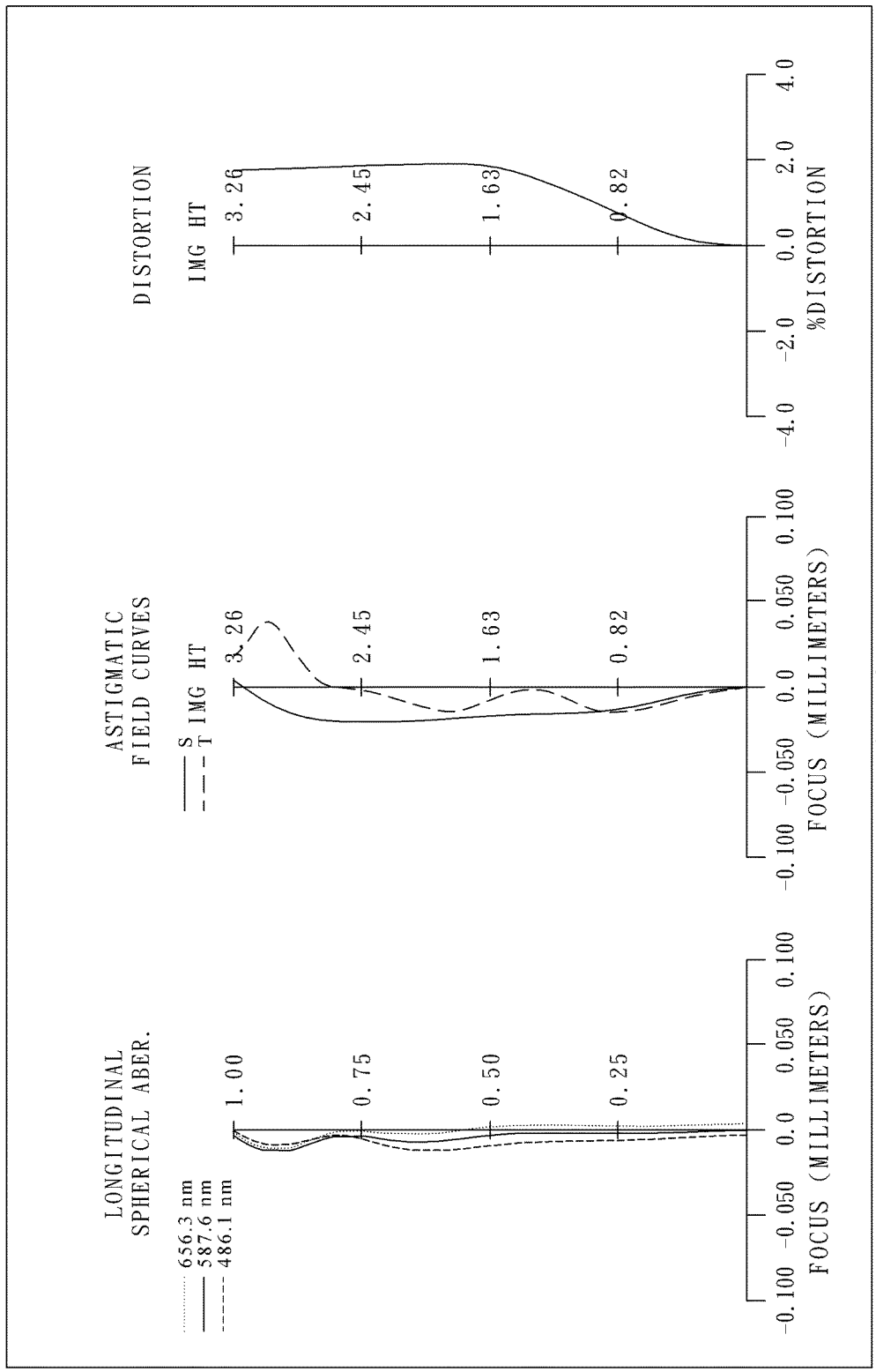
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus comprises an image lens assembly (not otherwise herein labeled) of the present disclosure and an image sensor 690. The image lens assembly comprises, in order from an object side to an image side, an aperture stop 600, a first lens element 610, a second lens element 620, a third lens element 630, a fourth lens element 640, a fifth lens element 650, and a sixth lens element 660, wherein each of the first through sixth lens elements (610-660) is a single and non-cemented lens element.

The first lens element 610 with positive refractive power has an object-side surface 611 being convex in a paraxial region thereof and an image-side surface 612 being concave in a paraxial region thereof, which are both aspheric, and the first lens element 610 is made of plastic.

The second lens element 620 with negative refractive power has an object-side surface 621 being convex in a paraxial region thereof and an image-side surface 622 being concave in a paraxial region thereof, which are both aspheric, and the second lens element 620 is made of plastic.

The third lens element 630 with positive refractive power has an object-side surface 631 being convex in a paraxial region thereof, an image-side surface 632 being concave in a paraxial region thereof with at least one convex critical point in an off-axial region thereof, both of the object-side surface 631 and the image-side surface 632 being aspheric; the third lens element 630 is made of plastic.

The fourth lens element 640 with positive refractive power has an object-side surface 641 being convex in a paraxial region thereof and an image-side surface 642 being concave in a paraxial region thereof, which are both aspheric, and the fourth lens element 640 is made of plastic.

The fifth lens element 650 with negative refractive power has an object-side surface 651 being convex in a paraxial region thereof, an image-side surface 652 being concave in a paraxial region thereof with at least one convex critical point in an off-axial region thereof, both of the object-side surface 651 and the image-side surface 652 being aspheric; the fifth lens element 650 is made of plastic.

The sixth lens element 660 with positive refractive power has an object-side surface 661 being convex in a paraxial region thereof, an image-side surface 662 being concave in a paraxial region thereof with at least one convex critical point in an off-axial region thereof, both of the object-side surface 661 and the image-side surface 662 being aspheric; the sixth lens element 660 is made of plastic.

The image lens assembly further comprises an IR-cut filter 670 located between the sixth lens element 660 and an image surface 680. The IR-cut filter 670 is made of glass and does not affect the focal length of the image lens assembly. The image sensor 690 is disposed on or near the image surface 680.

The detailed optical data of the 6th embodiment are shown in TABLE 15, and the aspheric surface data are shown in TABLE 16, wherein the units of the curvature radius, the thickness and the focal length are expressed in mm, and HFOV is half of the maximum field of view.

TABLE 15

(6th Embodiment)
f = 4.30 mm, Fno = 1.85, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.448 | | | | |
| 2 | Lens 1 | 1.698 | ASP | 0.579 | Plastic | 1.545 | 56.0 | 3.82 |
| 3 | | 8.153 | ASP | 0.063 | | | | |
| 4 | Lens 2 | 4.832 | ASP | 0.230 | Plastic | 1.650 | 21.5 | −4.88 |
| 5 | | 1.879 | ASP | 0.200 | | | | |
| 6 | Lens 3 | 2.578 | ASP | 0.530 | Plastic | 1.560 | 40.0 | 7.27 |
| 7 | | 6.510 | ASP | 0.330 | | | | |
| 8 | Lens 4 | 4.763 | ASP | 0.335 | Plastic | 1.560 | 40.0 | 22.95 |
| 9 | | 7.376 | ASP | 0.378 | | | | |
| 10 | Lens 5 | 10.257 | ASP | 0.343 | Plastic | 1.560 | 40.0 | −9.65 |
| 11 | | 3.498 | ASP | 0.185 | | | | |
| 12 | Lens 6 | 1.886 | ASP | 0.764 | Plastic | 1.544 | 55.9 | 445.79 |
| 13 | | 1.630 | ASP | 0.350 | | | | |
| 14 | IR-cut Filter | Plano | | 0.210 | Glass | 1.517 | 64.2 | — |
| 15 | | Plano | | 0.495 | | | | |
| 16 | Image | Plano | | — | | | | |

Note:
Reference wavelength is d-line 587.6 nm.
The effective radius on surface #9 is 1.350 mm.

TABLE 16

Aspheric Coefficients

| Surface # | 2 | 3 | 4 | 5 | 6 | 7 |
|---|---|---|---|---|---|---|
| k = | −6.6009E−01 | 1.5277E+01 | 8.9083E+00 | −2.4975E+00 | 3.1722E+00 | −6.5432E+01 |
| A4 = | 1.8376E−02 | 3.2332E−02 | −6.2924E−02 | −6.9830E−02 | −7.6473E−02 | −2.0458E−02 |
| A6 = | 3.3538E−03 | 1.0295E−02 | 1.4050E−02 | 2.1567E−01 | 2.3615E−02 | −6.3620E−02 |
| A8 = | 8.3711E−03 | −1.2153E−01 | −3.2148E−01 | −3.7359E−01 | 8.2828E−02 | 1.9870E−01 |
| A10 = | −1.7284E−02 | 1.1886E−01 | 3.2587E−01 | 4.1594E−01 | −3.6595E−01 | −3.9563E−01 |
| A12 = | 1.2674E−02 | −3.8594E−02 | −1.4393E−01 | −2.3224E−01 | 5.1351E−01 | 3.9856E−01 |
| A14 = | −3.8155E−03 | 1.7767E−03 | 2.2452E−02 | 5.3259E−02 | −3.4086E−01 | −2.1705E−01 |
| A16 = | | | | | 8.5951E−02 | 4.8257E−02 |

| Surface # | 8 | 9 | 10 | 11 | 12 | 13 |
|---|---|---|---|---|---|---|
| k = | −1.0000E+00 | −1.0000E+00 | 3.8766E+01 | −7.2388E+00 | −7.0031E+00 | −4.4173E+00 |
| A4 = | −3.3262E−02 | 5.9749E−03 | 9.1298E−02 | −1.4222E−01 | −3.1320E−01 | −1.5220E−01 |
| A6 = | −2.8576E−01 | −2.6125E−01 | −2.5910E−01 | 2.0253E−01 | 1.9835E−01 | 8.0635E−02 |
| A8 = | 6.5486E−01 | 3.7205E−01 | 2.5964E−01 | −1.9798E−01 | −7.8952E−02 | −3.3288E−02 |
| A10 = | −9.0910E−01 | −3.0781E−01 | −2.1772E−01 | 1.0077E−01 | 2.2854E−02 | 8.9571E−03 |
| A12 = | 7.1394E−01 | 1.3711E−01 | 9.5361E−02 | −2.7310E−02 | −4.4473E−03 | −1.4505E−03 |
| A14 = | −3.0315E−01 | −2.3525E−02 | −1.7058E−02 | 3.7975E−03 | 4.9749E−04 | 1.2531E−04 |
| A16 = | 5.1318E−02 | | 7.6466E−04 | −2.1481E−04 | −2.3684E−05 | −4.3253E−06 |

In the 6th embodiment, the equation of the aspheric surface profiles of the aforementioned lens elements is the same as the equation from the 1st embodiment. Also, the definitions of the parameters shown in TABLE 17 below are the same as those stated in the 1st embodiment, but the values for the conditions in the 6th embodiment are as specified below.

TABLE 17

(6th Embodiment)

| | | | |
|---|---|---|---|
| f [mm] | 4.30 | Td/ΣAT | 3.41 |
| f/EPD | 1.85 | f1/|f3| | 0.53 |
| HFOV [deg.] | 36.7 | f1/|f4| | 0.166 |
| ATmax/ATmin | 6.00 | f/R5 | 1.67 |
| ΣAT/T45 | 3.06 | f/R8 | 0.58 |
| CT3/CT2 | 2.30 | f/R10 | 1.23 |
| CT4/|Sag42| | 4.84 | |f/f4| + |f/f5| + |f/f6| | 0.64 |
| Td/EPD | 1.69 | | |

7th Embodiment

Figure 7A:
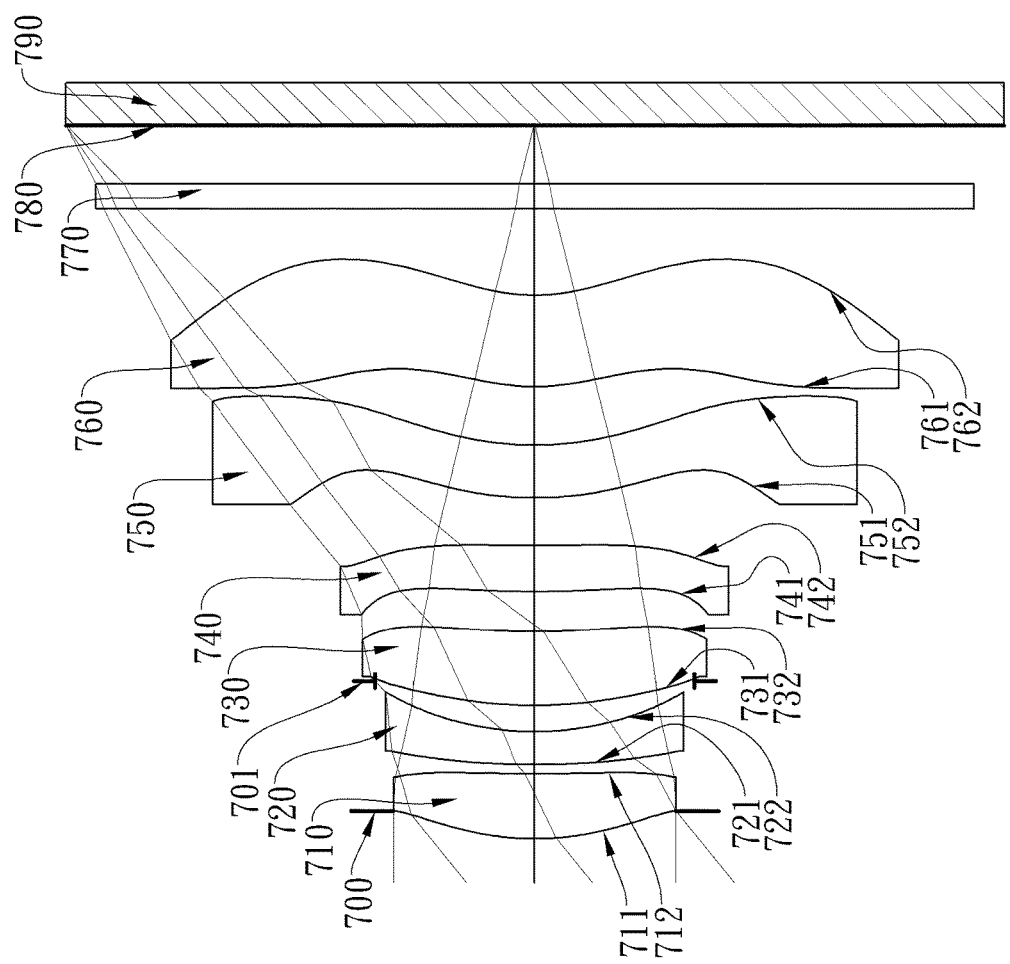
FIG. 7A is a schematic view of an imaging apparatus according to the 7th embodiment of the present disclosure.
Figure 7B:
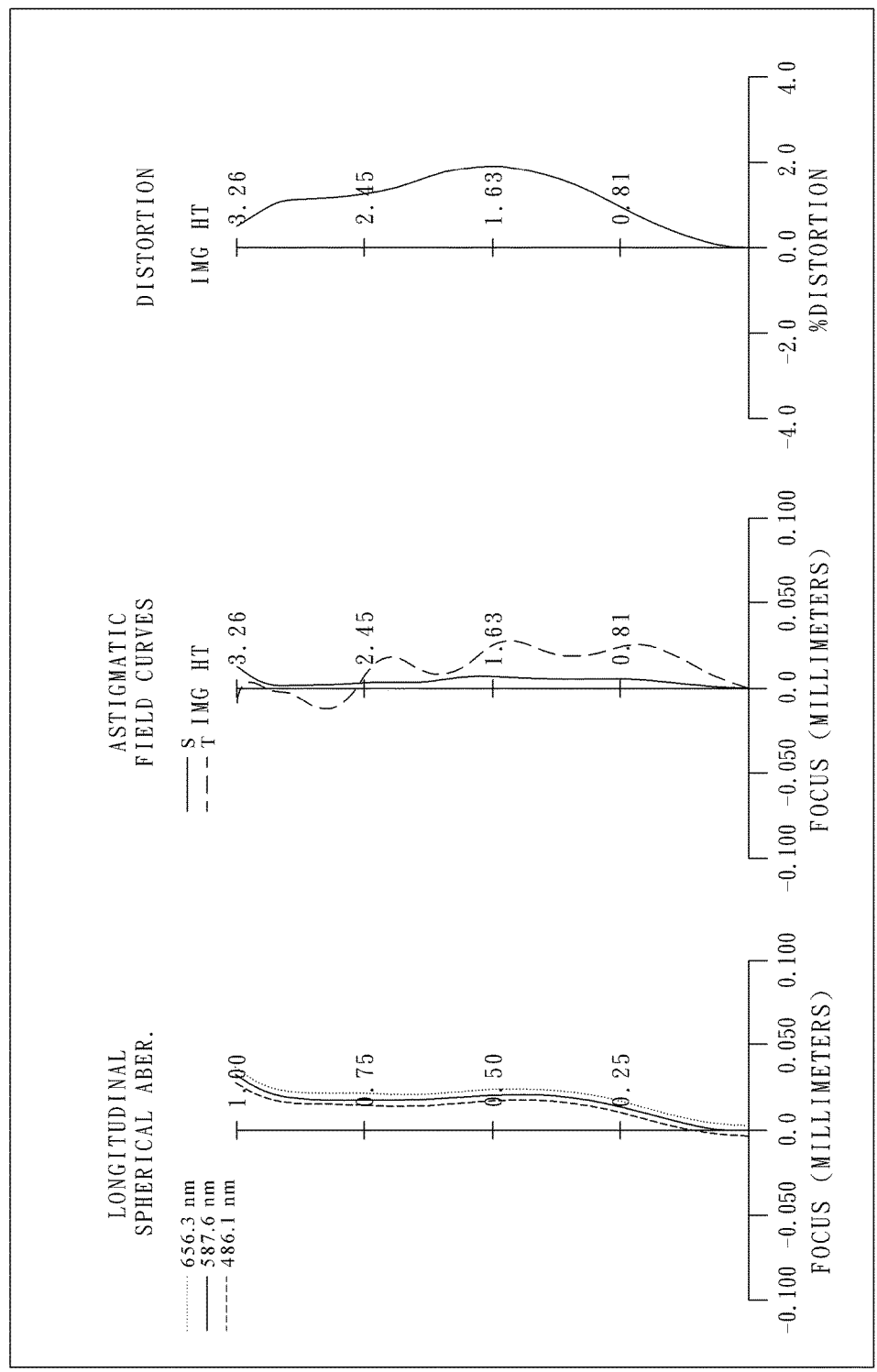
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus comprises an image lens assembly (not otherwise herein labeled) of the present disclosure and an image sensor 790. The image lens assembly comprises, in order from an object side to an image side, an aperture stop 700, a first lens element 710, a second lens element 720, a stop 701, a third lens element 730, a fourth lens element 740, a fifth lens element 750, and a sixth lens element 760, wherein each of the first through sixth lens elements (710-760) is a single and non-cemented lens element.

The first lens element 710 with positive refractive power has an object-side surface 711 being convex in a paraxial region thereof and an image-side surface 712 being concave in a paraxial region thereof, which are both aspheric, and the first lens element 710 is made of plastic.

The second lens element 720 with negative refractive power has an object-side surface 721 being convex in a paraxial region thereof and an image-side surface 722 being concave in a paraxial region thereof, which are both aspheric, and the second lens element 720 is made of plastic.

The third lens element 730 with positive refractive power has an object-side surface 731 being convex in a paraxial region thereof, an image-side surface 732 being concave in a paraxial region thereof with at least one convex critical point in an off-axial region thereof, both of the object-side surface 731 and the image-side surface 732 being aspheric; the third lens element 730 is made of plastic.

The fourth lens element 740 with positive refractive power has an object-side surface 741 being convex in a paraxial region thereof and an image-side surface 742 being concave in a paraxial region thereof, which are both aspheric, and the fourth lens element 740 is made of plastic.

The fifth lens element 750 with negative refractive power has an object-side surface 751 being convex in a paraxial region thereof, an image-side surface 752 being concave in a paraxial region thereof with at least one convex critical point in an off-axial region thereof, both of the object-side surface 751 and the image-side surface 752 being aspheric; the fifth lens element 750 is made of plastic.

The sixth lens element 760 with negative refractive power has an object-side surface 761 being convex in a paraxial region thereof, an image-side surface 762 being concave in a paraxial region thereof with at least one convex critical point in an off-axial region thereof, both of the object-side surface 761 and the image-side surface 762 being aspheric; the sixth lens element 760 is made of plastic.

The image lens assembly further comprises an IR-cut filter 770 located between the sixth lens element 760 and an image surface 780. The IR-cut filter 770 is made of glass and does not affect the focal length of the image lens assembly. The image sensor 790 is disposed on or near the image surface 780.

The detailed optical data of the 7th embodiment are shown in TABLE 18, and the aspheric surface data are shown in TABLE 19, wherein the units of the curvature radius, the thickness and the focal length are expressed in mm, and HFOV is half of the maximum field of view.

TABLE 18

(7th Embodiment)
f = 3.99 mm, Fno = 2.03, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.191 | | | | |
| 2 | Lens 1 | 1.992 | ASP | 0.452 | Plastic | 1.545 | 56.0 | 4.14 |
| 3 | | 15.856 | ASP | 0.062 | | | | |
| 4 | Lens 2 | 5.290 | ASP | 0.230 | Plastic | 1.639 | 23.5 | −5.35 |
| 5 | | 2.039 | ASP | 0.352 | | | | |
| 6 | Stop | Plano | | −0.170 | | | | |
| 7 | Lens 3 | 2.972 | ASP | 0.517 | Plastic | 1.544 | 55.9 | 10.40 |
| 8 | | 5.879 | ASP | 0.279 | | | | |
| 9 | Lens 4 | 7.130 | ASP | 0.321 | Plastic | 1.544 | 55.9 | 14.21 |
| 10 | | 90.783 | ASP | 0.330 | | | | |
| 11 | Lens 5 | 2.613 | ASP | 0.367 | Plastic | 1.544 | 55.9 | −43.44 |
| 12 | | 2.237 | ASP | 0.407 | | | | |
| 13 | Lens 6 | 1.526 | ASP | 0.639 | Plastic | 1.544 | 55.9 | −129.00 |
| 14 | | 1.274 | ASP | 0.600 | | | | |
| 15 | IR-cut Filter | Plano | | 0.175 | Glass | 1.517 | 64.2 | — |

TABLE 18-continued (7th Embodiment)
f = 3.99 mm, Fno = 2.03, HFOV = 39.0 deg.

| Surface # | | Curvature Radius | Thickness | Material | Index | Abbe # | Focal Length |
|---|---|---|---|---|---|---|---|
| 16 | | Plano | 0.402 | | | | |
| 17 | Image | Plano | — | | | | |

Note:
Reference wavelength is d-line 587.6 nm.
The effective radius on surface #6 is 1.110 mm.

TABLE 19

Aspheric Coefficients

| Surface # | 2 | 3 | 4 | 5 | 7 | 8 |
|---|---|---|---|---|---|---|
| k = | −1.5815E+00 | −9.0000E+01 | 1.4995E+01 | −1.1108E+00 | 4.2005E+00 | 5.1051E+00 |
| A4 = | 6.7121E−04 | −2.3484E−02 | −5.0616E−02 | −5.5338E−02 | −8.6499E−02 | −4.3863E−02 |
| A6 = | −2.0779E−02 | 9.8106E−03 | 1.5130E−01 | 2.1224E−01 | 1.3853E−01 | −5.8258E−02 |
| A8 = | −6.9224E−03 | −1.2261E−01 | −3.1319E−01 | −3.7912E−01 | −3.3087E−01 | 1.9916E−01 |
| A10 = | −2.4020E−02 | 1.1771E−01 | 3.2277E−01 | 4.1627E−01 | 4.6206E−01 | −3.9662E−01 |
| A12 = | 1.2136E−02 | −5.0355E−02 | −1.5225E−01 | −2.2898E−01 | −3.9078E−01 | 3.7893E−01 |
| A14 = | −5.0837E−03 | 5.5903E−03 | 2.3018E−02 | 4.5960E−02 | 1.9065E−01 | −1.8998E−01 |
| A16 = | | | | | −4.0859E−02 | 3.9789E−02 |

| Surface # | 9 | 10 | 11 | 12 | 13 | 14 |
|---|---|---|---|---|---|---|
| k = | −1.0000E+00 | −1.0000E+00 | 8.9856E−01 | −1.6057E−01 | −4.4483E+00 | −3.3463E+00 |
| A4 = | −3.8684E−03 | 5.9922E−02 | 9.9239E−02 | −2.5835E−02 | −1.6928E−01 | −1.2111E−01 |
| A6 = | −2.2627E−01 | −3.8995E−01 | −2.6762E−01 | 1.1224E−02 | 3.4337E−02 | 3.8740E−02 |
| A8 = | 4.2583E−01 | 5.9033E−01 | 2.4936E−01 | −3.6194E−02 | 5.8449E−03 | −7.4667E−03 |
| A10 = | −4.7775E−01 | −4.9475E−01 | −1.6224E−01 | 2.1498E−02 | −2.2154E−03 | −1.9522E−06 |
| A12 = | 2.6980E−01 | 2.0990E−01 | 6.0459E−02 | −5.7611E−03 | −2.6320E−05 | 2.8683E−04 |
| A14 = | −7.8907E−02 | −3.3706E−02 | −1.1456E−02 | 7.5150E−04 | 5.9862E−05 | −4.6848E−05 |
| A16 = | 8.8534E−03 | | 8.6238E−04 | −3.9169E−05 | −4.8820E−06 | 2.3937E−06 |

In the 7th embodiment, the equation of the aspheric surface profiles of the aforementioned lens elements is the same as the equation from the 1st embodiment. Also, the definitions of the parameters shown in TABLE 20 below are the same as those stated in the 1st embodiment, but the values for the conditions in the 7th embodiment are as specified below.

TABLE 20

(7th Embodiment)

| f [mm] | 3.99 | Td/ΣAT | 3.00 |
|---|---|---|---|
| f/EPD | 2.03 | f1/|f3| | 0.40 |
| HFOV [deg.] | 39.0 | f1/|f4| | 0.291 |
| ATmax/ATmin | 6.56 | f/R5 | 1.34 |
| ΣAT/T45 | 3.82 | f/R8 | 0.04 |
| CT3/CT2 | 2.25 | f/R10 | 1.78 |
| CT4/|Sag42| | 1.99 | |f/f4| + |f/f5| + |f/f6| | 0.40 |
| Td/EPD | 1.93 | | |

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising, in order from an object side to an image side:

a first lens element with positive refractive power having an object-side surface being convex in a paraxial region thereof;

a second lens element;

a third lens element having an object-side surface being convex in a paraxial region thereof;

a fourth lens element;

a fifth lens element with an image-side surface having at least one convex critical point in an off-axial region thereof, both of an object-side surface and the image-side surface thereof being aspheric; and a sixth lens element having an image-side surface being concave in a paraxial region thereof, at least one convex critical point in an off-axial region thereof, both of an object-side surface and the image-side surface thereof being aspheric;

wherein the image lens assembly has a total of six lens elements; wherein each of the first through sixth lens elements is a single and non-cemented lens element; and wherein a focal length of the image lens assembly is f, a focal length of the first lens element is f1, a focal length of the fourth lens element is f4, a curvature radius of the object-side surface of the third lens element is R5, a curvature radius of an image-side surface of the fourth lens element is R8, a curvature radius of the image-side surface of the fifth lens element is R10, a maximum of axial distances between every two adjacent lens elements of the image lens assembly is ATmax, a minimum of axial distances between every two adjacent lens elements of the image lens assembly is ATmin, and the following conditions are satisfied:

$0 \leq f/R8 < 10;$ $0 \leq f/R10 < 10;$ $0.80 < f/R5 < 10;$ $|f1/|f4|| < 0.50;$ and ATmax/ATmin < 7.50.

2. The image lens assembly of claim 1, wherein a sum of axial distances between every two adjacent lens elements of the image lens assembly is ΣAT, an axial distance between the fourth lens element and the fifth lens element is T45, and the following condition is satisfied:

$\Sigma AT/T45 < 7.0.$

3. The image lens assembly of claim 1, wherein the first lens element has an image-side surface being concave in a paraxial region thereof.

4. The image lens assembly of claim 1, wherein an axial distance between the object-side surface of the first lens element and the image-side surface of the sixth lens element is Td, an entrance pupil diameter of the image lens assembly is EPD, and the following condition is satisfied:

$1.0 < Td/EPD < 2.0.$

5. The image lens assembly of claim 1, wherein the focal length of the image lens assembly is f, the focal length of the fourth lens element is f4, a focal length of the fifth lens element is f5, a focal length of the sixth lens element is f6, and the following condition is satisfied:

$|f/f4|+|f/f5|+|f/f6| < 2.0.$

6. The image lens assembly of claim 1, wherein the sixth lens element has a largest central thickness among the six lens elements.

7. The image lens assembly of claim 1, wherein each of the first through sixth lens elements has an object-side surface being convex in a paraxial region thereof and an image-side surface being concave in a paraxial region thereof.

8. The image lens assembly of claim 1, wherein an axial distance between the object-side surface of the first lens element and the image-side surface of the sixth lens element is Td, a sum of axial distances between every two adjacent lens elements of the image lens assembly is ΣAT, and the following condition is satisfied:

$2.0 < Td/\Sigma AT < 20.$

9. The image lens assembly of claim 1, wherein the focal length of the image lens assembly is f, the curvature radius of the object-side surface of the third lens element is R5, and the following condition is satisfied:

$1.0 < f/R5 < 4.0.$

10. The image lens assembly of claim 1, wherein an axial distance between the third lens element and the fourth lens element is T34, and T34 is a maximum among axial distances between every two adjacent lens elements of the image lens assembly; and wherein the focal length of the first lens element is f1, a focal length of the third lens element is f3, and the following condition is satisfied:

$|f1/|f3|| < 1.0.$

11. The image lens assembly of claim 1, wherein a central thickness of the fourth lens element is CT4, a distance in parallel with an optical axis from an axial vertex on an image-side surface of the fourth lens element to a maximum effective diameter position on the image-side surface of the fourth lens element is Sag42, and the following condition is satisfied:

$1.75 < CT4/|Sag42|.$

12. The image lens assembly of claim 1, wherein the third lens element has an image-side surface being concave in a paraxial region thereof and at least one convex critical point in an off-axial region thereof.

13. The image lens assembly of claim 1, wherein the second lens element has negative refractive power, the third lens element has positive refractive power, a central thickness of the second lens element is CT2, a central thickness of the third lens element is CT3, and the following condition is satisfied:

$2.0 < CT3/CT2 < 3.5.$

14. An imaging apparatus comprising the image lens assembly of claim 1 and an image sensor.

15. An electronic device comprising the imaging apparatus of claim 14.

16. An image lens assembly comprising, in order from an object side to an image side:
  a first lens element with positive refractive power having an object-side surface being convex in a paraxial region thereof and an image-side surface being concave in a paraxial region thereof;
  a second lens element;
  a third lens element having an object-side surface being convex in a paraxial region thereof;
  a fourth lens element;
  a fifth lens element with an image-side surface having at least one convex critical point in an off-axial region thereof, both of an object-side surface and the image-side surface thereof being aspheric; and
  a sixth lens element having an object-side surface being convex in a paraxial region thereof and an image-side surface being concave in a paraxial region thereof, the image-side surface of the sixth lens element having at least one convex critical point in an off-axial region thereof, both of the object-side surface and the image-side surface thereof being aspheric;
  wherein the image lens assembly has a total of six lens elements, each of the first through sixth lens elements is a single and non-cemented lens element; a focal length of the image lens assembly is f, a curvature radius of the object-side surface of the third lens element is R5, a curvature radius of an image-side surface of the fourth lens element is R8, a curvature radius of the image-side surface of the fifth lens element is R10, a sum of axial distances between every two adjacent lens elements of the image lens assembly is ΣAT, an axial distance between the fourth lens element and the fifth lens element is T45, a maximum among axial distances between every two adjacent lens elements of the image lens assembly is ATmax, a minimum among axial distances between every two adjacent lens elements of the image lens assembly is ATmin, and the following conditions are satisfied:

$0 \leq f/R8 < 10;$ $0 \leq f/R10 < 10;$ $0.80 < f/R5 < 10;$ $\Sigma AT/T45 < 7.0;$ and $ATmax/ATmin < 7.50.$ 17. The image lens assembly of claim 16, wherein the sixth lens element has a largest central thickness among the six lens elements.

18. The image lens assembly of claim 16, wherein the focal length of the image lens assembly is f, the curvature radius of the object-side surface of the third lens element is R5, and the following condition is satisfied:

$1.0 < f/R5 < 4.0.$

19. The image lens assembly of claim 16, wherein the focal length of the image lens assembly is f, a focal length of the fourth lens element is f4, a focal length of the fifth lens element is f5, a focal length of the sixth lens element is f6, and the following condition is satisfied:

$|f/f4|+|f/f5|+|f/f6| < 2.0.$

20. The image lens assembly of claim 16, wherein the third lens element has an image-side surface being concave in a paraxial region thereof and at least one convex critical point in an off-axial region thereof.

21. The image lens assembly of claim 16, wherein an axial distance between the object-side surface of the first lens element and the image-side surface of the sixth lens element is Td, an entrance pupil diameter of the image lens assembly is EPD, and the following condition is satisfied:

$1.0 < Td/EPD < 2.0.$

22. The image lens assembly of claim 16, wherein a central thickness of the fourth lens element is CT4, a displacement in parallel with an optical axis from an axial vertex on an image-side surface of the fourth lens element to a maximum effective diameter position on the image-side surface of the fourth lens element is Sag42, and the following condition is satisfied:

$1.75 < CT4/|Sag42|.$

23. An imaging apparatus, comprising the image lens assembly of claim 16 and an image sensor.

24. An electronic device, comprising the imaging apparatus of claim 23.

* * * * *